US012739013B2

(12) United States Patent
Yuan et al.

(10) Patent No.: US 12,739,013 B2
(45) Date of Patent: Sep. 15, 2026

(54) PER-TRANSMISSION AND RECEPTION POINT (TRP) BEAM FAILURE REPORTING

(71) Applicant: QUALCOMM Incorporated, San Diego, CA (US)

(72) Inventors: Fang Yuan, Beijing (CN); Yan Zhou, San Diego, CA (US); Tao Luo, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 271 days.

(21) Appl. No.: 18/294,468

(22) PCT Filed: Sep. 30, 2021

(86) PCT No.: PCT/CN2021/122066
§ 371 (c)(1),
(2) Date: Feb. 1, 2024

(87) PCT Pub. No.: WO2023/050263
PCT Pub. Date: Apr. 6, 2023

(65) Prior Publication Data
US 2024/0356621 A1 Oct. 24, 2024

(51) Int. Cl.
*H04B 7/06* (2006.01)
*H04W 24/04* (2009.01)

(52) U.S. Cl.
CPC ........ *H04B 7/06964* (2023.05); *H04W 24/04* (2013.01)

(58) Field of Classification Search
CPC .. H04B 7/06964; H04B 7/024; H04B 17/328; H04B 17/336; H04W 24/04;
(Continued)

(56) References Cited

U.S. PATENT DOCUMENTS 12,289,625 B2 * 4/2025 Koskela ................ H04L 5/0091
2018/0302889 A1 10/2018 Guo et al.
(Continued)

FOREIGN PATENT DOCUMENTS

CN 110896546 A 3/2020

OTHER PUBLICATIONS

CMCC: Enhancements on Beam Management for Multi-TRP, 3GPP TSG RAN WG1 #103-e, R1-2008003, e-Meeting, Oct. 26-Nov. 13, 2020, Nov. 13, 2020 (Nov. 13, 2020), 4 Pages, sections 2-4.
(Continued)

*Primary Examiner* — Habte Mered
(74) *Attorney, Agent, or Firm* — Holland & Hart LLP

(57) ABSTRACT

This disclosure provides systems, methods and apparatus, including computer programs encoded on computer storage media, for reporting, from a user equipment (UE), beam failure recovery (BFR) information for multiple transmission and reception points (TRPs) via a BFR medium access control (MAC) control element (MAC-CE) in multi-TRP deployment scenarios. In some aspects, the UE may monitor a beam failure status for each of a first TRP and a second TRP and may transmit a BFR MAC-CE if the UE detects a beam failure for the first TRP or the second TRP. The UE may include, in the BFR MAC-CE, a status indicator field that indicates the beam failure status for each of the first TRP and the second TRP and whether a candidate reference signal is reported for identified TRPs of the first TRP and the second TRP for which a beam failure is detected.

24 Claims, 10 Drawing Sheets

900

(58) Field of Classification Search
CPC ..... H04W 76/15; H04W 24/08; H04W 24/10; H04W 72/231; H04L 5/0035
See application file for complete search history.

(56) References Cited

U.S. PATENT DOCUMENTS

| | | | | |
|---|---|---|---|---|
| 2020/0350972 | A1 | 11/2020 | Yi et al. | |
| 2021/0044342 | A1 | 2/2021 | He | |
| 2023/0139655 | A1* | 5/2023 | Guo | H04W 36/085 370/329 |
| 2023/0180332 | A1* | 6/2023 | Agiwal | H04W 76/19 370/216 |
| 2023/0199529 | A1* | 6/2023 | Koskela | H04L 5/0091 370/216 |
| 2024/0179548 | A1* | 5/2024 | Koskela | H04W 24/08 |
| 2024/0372602 | A1* | 11/2024 | Kang | H04B 7/06964 |

OTHER PUBLICATIONS

International Search Report and Written Opinion—PCT/CN2021/122066—ISA/EPO—May 25, 2022 (2107972WO1).

Convida Wireless: "On Per-TRP Beam Failure Recovery", 3GPP TSG-RAN WG1#104-e, R1-2101416, e-Meeting, Jan. 25-Feb. 5, 2021, 3rd Generation Partnership Project, Mobile Competence Centre, 650, Route Des Lucioles, F-06921 Sophia-Antipolis Cedex, France, vol. RAN WG1, No. e-Meeting, Jan. 25, 2021-Feb. 5, 2021, Jan. 19, 2021, 5 p. XP051971581, pp. 2,3,4, figure 1.

Qualcomm Inc: "Enhancements on beam management for multi-TRP", 3GPP TSG RAN WG1 Meeting #104-bis-e, R1-2103153, Apr. 12-20, 2021, 3rd Generation Partnership Project, Mobile Competence Centre, 650, Route Des Lucioles, F-06921 Sophia-Antipolis Cedex, France, vol. RAN WG1, No. Apr. 12, 2021-Apr. 20, 2021, Apr. 7, 2021, 5 pages, XP052177953, pp. 3,4.

Supplementary European Search Report—EP219588415—Search Authority—Munich—May 19, 2025 (2107972EP).

* cited by examiner

200

500

PER-TRANSMISSION AND RECEPTION POINT (TRP) BEAM FAILURE REPORTING

CROSS REFERENCE

The present Application is a 371 national stage filing of International PCT Application No. PCT/CN2021/122066 by YUAN et al. entitled "PER-TRANSMISSION AND RECEPTION POINT (TRP) BEAM FAILURE REPORTING," filed Sep. 30, 2021, which is assigned to the assignee hereof, and which is expressly incorporated by reference in its entirety herein.

TECHNICAL FIELD

This disclosure relates to wireless communications, including per-transmission and reception point (TRP) beam failure reporting.

DESCRIPTION OF THE RELATED TECHNOLOGY

Wireless communications systems are widely deployed to provide various types of communication content such as voice, video, packet data, messaging, broadcast, and so on. These systems may be capable of supporting communication with multiple users by sharing the available system resources (for example, time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal FDMA (OFDMA), or discrete Fourier transform spread orthogonal frequency division multiplexing (DFT-S-OFDM). A wireless multiple-access communications system may include one or more base stations (BSs) or one or more network access nodes, each simultaneously supporting communication for multiple communication devices, which may be otherwise known as user equipment (UE).

SUMMARY

The systems, methods and devices of this disclosure each have several innovative aspects, no single one of which is solely responsible for the desirable attributes disclosed herein.

One innovative aspect of the subject matter described in this disclosure can be implemented in a method for wireless communications at a user equipment (UE). The method may include communicating with a first transmission and reception point (TRP) in accordance with a first configuration for directional communications, communicating with a second TRP in accordance with a second configuration for directional communications, and transmitting a control signal indicating a TRP beam failure status for the first configuration for directional communications with the first TRP and the second configuration for directional communications with the second TRP.

Another innovative aspect of the subject matter described in this disclosure can be implemented in an apparatus for wireless communications at a UE. The apparatus may include a first interface, a second interface, and a processing system. The first interface may be configured to communicate with a first TRP in accordance with a first configuration for directional communications and communicate with a second TRP in accordance with a second configuration for directional communications. The first interface or the second interface may be configured to output a control signal indicating a TRP beam failure status for the first configuration for directional communications with the first TRP and the second configuration for directional communications with the second TRP.

Another innovative aspect of the subject matter described in this disclosure can be implemented in an apparatus for wireless communications at a UE. The apparatus may include a processor, memory coupled with the processor, and instructions stored in the memory. The instructions may be executable by the processor to cause the apparatus to communicate with a first TRP in accordance with a first configuration for directional communications, communicate with a second TRP in accordance with a second configuration for directional communications, and transmit a control signal indicating a TRP beam failure status for the first configuration for directional communications with the first TRP and the second configuration for directional communications with the second TRP.

Another innovative aspect of the subject matter described in this disclosure can be implemented in another apparatus for wireless communications at a UE. The apparatus may include means for communicating with a first TRP in accordance with a first configuration for directional communications, means for communicating with a second TRP in accordance with a second configuration for directional communications, and means for transmitting a control signal indicating a TRP beam failure status for the first configuration for directional communications with the first TRP and the second configuration for directional communications with the second TRP.

Another innovative aspect of the subject matter described in this disclosure can be implemented in a non-transitory computer-readable medium storing code for wireless communications at a UE. The code may include instructions executable by a processor to communicate with a first TRP in accordance with a first configuration for directional communications, communicate with a second TRP in accordance with a second configuration for directional communications, and transmit a control signal indicating a TRP beam failure status for the first configuration for directional communications with the first TRP and the second configuration for directional communications with the second TRP.

In some implementations of the method, apparatuses, and non-transitory computer-readable medium described herein, transmitting the control signal indicating the TRP beam failure status may include operations, features, means, or instructions for transmitting, via the control signal, an indication of a cell associated with the first TRP and the second TRP on which a beam failure may be detected.

In some implementations of the method, apparatuses, and non-transitory computer-readable medium described herein, transmitting the control signal indicating the TRP beam failure status may include operations, features, means, or instructions for transmitting, via the control signal, an indication of per-component carrier beam failure, where the TRP beam failure status may be associated with a first component carrier that may be enabled for TRP beam failure reporting.

In some implementations of the method, apparatuses, and non-transitory computer-readable medium described herein, transmitting the control signal indicating the TRP beam failure status may include operations, features, means, or instructions for transmitting, via the control signal, a status indicator indicating the TRP beam failure status and indicating whether a candidate reference signal may be reported via the control signal for identified TRPs of the first TRP and the second TRP for which beam failure may be detected.

One innovative aspect of the subject matter described in this disclosure can be implemented in a method for wireless communications at a network entity. The method may include communicating with a UE via a first TRP in accordance with a first configuration for directional communications, communicating with the UE via a second TRP in accordance with a second configuration for directional communications, and receiving, from the UE, a control signal indicating a TRP beam failure status for the first configuration for directional communications with the first TRP and the second configuration for directional communications with the second TRP.

Another innovative aspect of the subject matter described in this disclosure can be implemented in an apparatus for wireless communications at a network entity. The apparatus may include a first interface, a second interface, and a processing system. The first interface may be configured to communicate with a UE via a first TRP in accordance with a first configuration for directional communications and communicate with the UE via a second TRP in accordance with a second configuration for directional communications. The first interface or the second interface may be configured to obtain, from the UE, a control signal indicating a TRP beam failure status for the first configuration for directional communications with the first TRP and the second configuration for directional communications with the second TRP.

Another innovative aspect of the subject matter described in this disclosure can be implemented in another apparatus for wireless communications at a network entity. The apparatus may include a processor, memory coupled with the processor, and instructions stored in the memory. The instructions may be executable by the processor to cause the apparatus to communicate with a UE via a first TRP in accordance with a first configuration for directional communications, communicate with the UE via a second TRP in accordance with a second configuration for directional communications, and receive, from the UE, a control signal indicating a TRP beam failure status for the first configuration for directional communications with the first TRP and the second configuration for directional communications with the second TRP.

Another innovative aspect of the subject matter described in this disclosure can be implemented in another apparatus for wireless communications at a network entity. The apparatus may include means for communicating with a UE via a first TRP in accordance with a first configuration for directional communications, means for communicating with the UE via a second TRP in accordance with a second configuration for directional communications, and means for receiving, from the UE, a control signal indicating a TRP beam failure status for the first configuration for directional communications with the first TRP and the second configuration for directional communications with the second TRP.

Another innovative aspect of the subject matter described in this disclosure can be implemented in a non-transitory computer-readable medium storing code for wireless communications at a network entity. The code may include instructions executable by a processor to communicate with a UE via a first TRP in accordance with a first configuration for directional communications, communicate with the UE via a second TRP in accordance with a second configuration for directional communications, and receive, from the UE, a control signal indicating a TRP beam failure status for the first configuration for directional communications with the first TRP and the second configuration for directional communications with the second TRP.

In some implementations of the method, apparatuses, and non-transitory computer-readable medium described herein, receiving the control signal indicating the TRP beam failure status may include operations, features, means, or instructions for receiving, via the control signal, an indication of a cell associated with the first TRP and the second TRP on which a beam failure may be detected.

In some implementations of the method, apparatuses, and non-transitory computer-readable medium described herein, receiving the control signal indicating the TRP beam failure status may include operations, features, means, or instructions for receiving, via the control signal, an indication of per-component carrier beam failure, where the TRP beam failure status may be associated with a first component carrier that may be enabled for TRP beam failure reporting.

In some implementations of the method, apparatuses, and non-transitory computer-readable medium described herein, receiving the control signal indicating the TRP beam failure status may include operations, features, means, or instructions for receiving, via the control signal, a status indicator indicating the TRP beam failure status and indicating whether a candidate reference signal may be reported via the control signal for identified TRPs of the first TRP and the second TRP for which beam failure may be detected.

Details of one or more implementations of the subject matter described in this disclosure are set forth in the accompanying drawings and the description below. Other features, aspects, and advantages will become apparent from the description, the drawings and the claims. Note that the relative dimensions of the following figures may not be drawn to scale.

BRIEF DESCRIPTION OF THE DRAWINGS

Like reference numbers and designations in the various drawings indicate like elements.

DETAILED DESCRIPTION

Figure 1:
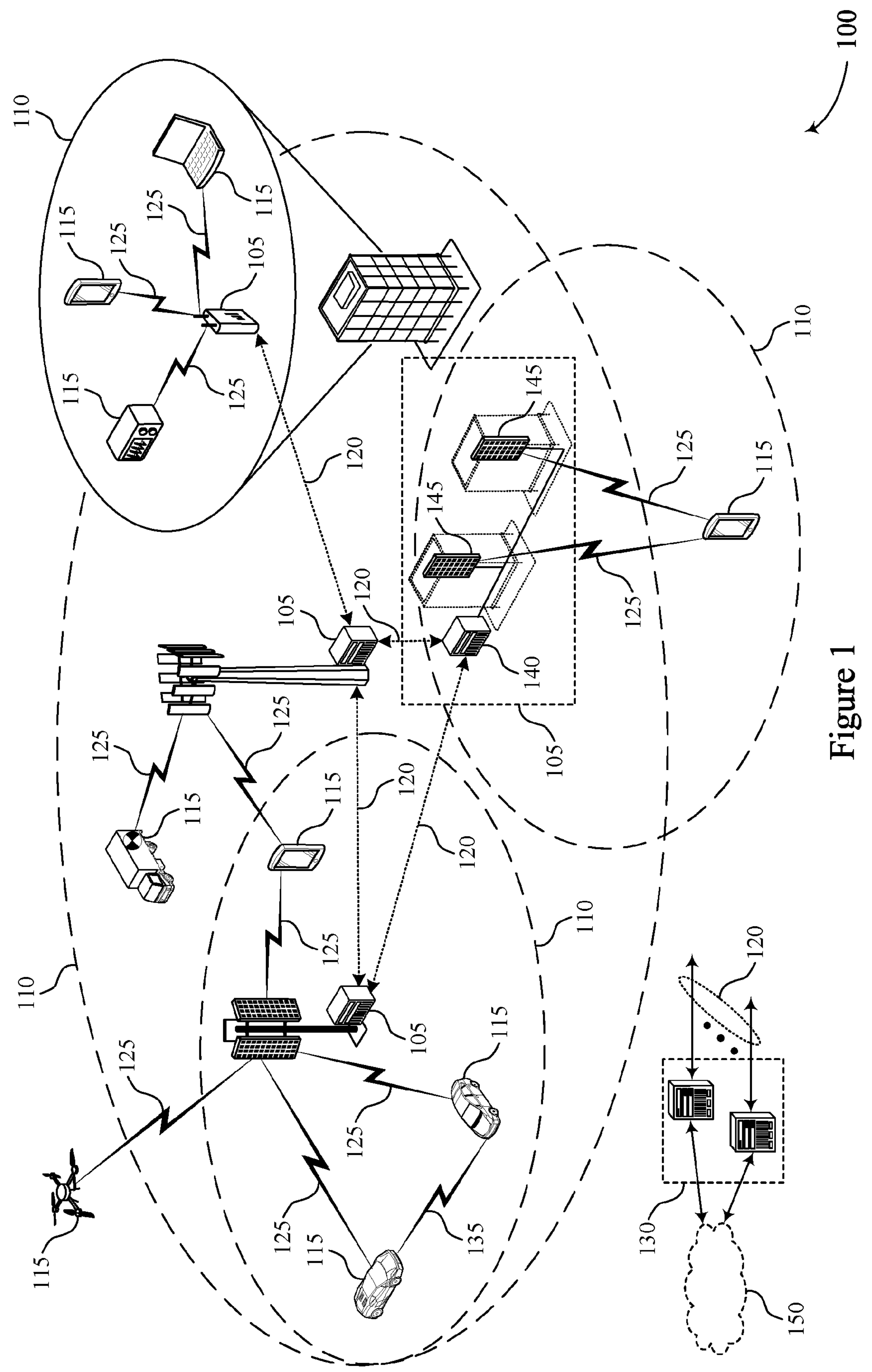
FIG. 1 illustrates an example wireless communications system that supports per-transmission and reception point (TRP) beam failure reporting.

The following description is directed to some implementations for the purposes of describing the innovative aspects of this disclosure. However, a person having ordinary skill in the art will readily recognize that the teachings herein can be applied in a multitude of different ways. The described implementations may be implemented in any device, system or network that is capable of transmitting and receiving radio frequency (RF) signals according to any of the Institute of Electrical and Electronics Engineers (IEEE) 16.11 standards, or any of the IEEE 802.11 standards, the Bluetooth® standard, code division multiple access (CDMA), frequency division multiple access (FDMA), time division multiple access (TDMA), Global System for Mobile communications (GSM), GSM/General Packet Radio Service (GPRS), Enhanced Data GSM Environment (EDGE), Terrestrial Trunked Radio (TETRA), Wideband-CDMA (W-CDMA), Evolution Data Optimized (EV-DO), 1×EV-DO, EV-DO Rev A, EV-DO Rev B, High Speed Packet Access (HSPA), High Speed Downlink Packet Access (HSDPA), High Speed Uplink Packet Access (HSUPA), Evolved High Speed Packet Access (HSPA+), Long Term Evolution (LTE), AMPS, or other known signals that are used to communicate within a wireless, cellular or internet of things (IoT) network, such as a system utilizing 3G, 4G or 5G, or further implementations thereof, technology.

In some systems, a user equipment (UE) and one or more transmission and reception points (TRPs), which may function as one or more components of a base station (BS) and may be co-located, geographically distributed, or virtually distributed, may communicate with each other using directional communication. For example, the UE may transmit to, or receive from, a first TRP using a first configuration for directional communication (such as a first transmit-receive beam pair between the UE and the first TRP). Similarly, the UE may transmit to, or receive from, a second TRP using a second configuration for directional communication (such as a second transmit-receive beam pair between the UE and the second TRP). The UE may be configured with single downlink control information (DCI)-based multiple TRP (multi-TRP) operation, or configured with multiple DCI-based multiple TRP operation. For single DCI-based multiple TRP operation, a single DCI may be applied to schedule transmissions or receptions associated with multiple TRPs. For multiple DCI-based multiple TRP operation, multiple DCIs may be applied to schedule transmissions or receptions associated with the multiple respective TRPs.

The UE may be explicitly configured with or, based on a rule, implicitly select, identify, obtain, or otherwise determine multiple sets of reference signals for beam failure detection (BFD) and, in some aspects, the multiple sets of reference signals may be associated with the multiple TRPs with which the UE communicates. As such, to maintain a reliable communication link between the UE and the two TRPs, the UE may measure the set of one or more reference signals associated with the first TRP and the set of one or more reference signals associated with the second TRP. If the UE persistently measures that the set of reference signals from one of the first TRP or the second TRP fail to satisfy a threshold signal quality, the UE may declare a beam failure event for the one of the first TRP or the second TRP and may transmit a beam failure recovery (BFR) medium access control (MAC) control element (MAC-CE) to a network entity (such as to one or more of the first TRP, the second TRP, or another network entity). Some systems may lack a BFR MAC-CE format that supports BFR reporting for multiple TRPs, and it may be desirable for the UE to support such a BFR MAC-CE format to enable BFR reporting across various deployment scenarios, including multi-TRP deployment scenarios.

In some implementations of the present disclosure, the UE may support a BFR MAC-CE format according to which the UE may report BFR information for multiple TRPs to a network entity. Such a network entity may refer to one or more components of a BS, the first TRP, the second TRP, or another network-interfacing device. For example, in some implementations, the UE may generate a BFR MAC-CE including a status indicator field that indicates a beam failure status for the first TRP and for the second TRP and also indicates whether a candidate reference signal is provided via the BFR MAC-CE for the first TRP and for the second TRP. The status indicator field may include a codepoint (such as a quantity of bits) and different codepoints may indicate different combinations of beam failure detection (BFD) for the first TRP and for the second TRP and whether a candidate reference signal is provided via the BFR MAC-CE for the first TRP and for the second TRP. For example, the status indicator field may include three bits and different codepoints associated with the three bits may map to different possible combinations of BFD and candidate reference signal reporting for the first TRP and for the second TRP.

Alternatively, the status indicator field may include four bits and each bit of the four bits may indicate one of a beam failure status of the first TRP, a beam failure status of the second TRP, whether a candidate reference signal is reported for the first TRP, and whether a candidate reference signal is reported for the second TRP. In some aspects, different status indicators also may indicate or be otherwise associated with different formats for the BFR MAC-CE, as different status indicators indicate different combinations of beam failure statuses and a reporting or a lack of reporting of candidate reference signals for multiple TRPs. As such, the UE may use different quantities of bits to convey the information indicated to be carried by the BFR MAC-CE by different status indicators and the UE may use multiple different formats of the BFR MAC-CE to support such variable quantities of bits that may be included in the BFR MAC-CE.

Particular implementations of the subject matter described in this disclosure can be implemented to realize one or more of the following potential advantages. For example, as a result of providing information relating to beam failure statuses for each of multiple TRPs and, potentially, reporting candidate reference signals for one or more of any TRPs associated with a beam failure via a BFR MAC-CE, the UE may provide more complete channel information to a network entity. As such, the network entity may be able to re-configure the UE with one or multiple relatively more suitable configurations for directional communication with one or multiple TRPs with relatively lower latency as compared to reporting BFD via multiple, separate BFR MAC-CEs. In some aspects, such relatively more suitable configurations for directional communication (such as configurations for more suitable directional beams) may provide greater reliability for communication between the UE and the one or multiple TRPs. Further, as a result of such greater reliability, the UE and the one or multiple TRPs may achieve greater spectral efficiency, higher data rates, and greater system capacity, among other benefits.

FIG. 1 illustrates an example wireless communications system 100 that supports per-TRP beam failure reporting. The wireless communications system 100 may include one or more BSs 105, one or more UEs 115, and a core network 130. In some implementations, the wireless communications system 100 may be a Long Term Evolution (LTE) network, an LTE-Advanced (LTE-A) network, an LTE-A Pro network, or a New Radio (NR) network. In some implementations, the wireless communications system 100 may support enhanced broadband communications, ultra-reliable (for example, mission expected) communications, low latency communications, communications with low-cost and low-complexity devices, or any combination thereof.

The BSs 105 may be dispersed throughout a geographic area to form the wireless communications system 100 and may be devices in different forms or having different capabilities. The BSs 105 and the UEs 115 may wirelessly communicate via one or more communication links 125. Each BS 105 may provide a coverage area 110 over which the UEs 115 and the BS 105 may establish one or more communication links 125. The coverage area 110 may be an example of a geographic area over which a BS 105 and a UE 115 may support the communication of signals according to one or more radio access technologies.

The UEs 115 may be dispersed throughout a coverage area 110 of the wireless communications system 100, and each UE 115 may be stationary, or mobile, or both at different times. The UEs 115 may be devices in different forms or having different capabilities. Some example UEs 115 are illustrated in FIG. 1. The UEs 115 described herein may be able to communicate with various types of devices, such as other UEs 115, the BSs 105, or network equipment (for example, core network nodes, relay devices, integrated access and backhaul (IAB) nodes, or other network equipment), as shown in FIG. 1.

The BSs 105 may communicate with the core network 130, or with one another, or both. For example, the BSs 105 may interface with the core network 130 through one or more backhaul links 120 (for example, via an S1, N2, N3, or another interface). The BSs 105 may communicate with one another over the backhaul links 120 (for example, via an X2, Xn, or another interface) either directly (for example, directly between BSs 105), or indirectly (for example, via core network 130), or both. In some implementations, the backhaul links 120 may be or include one or more wireless links.

One or more of the BSs 105 described herein may include or may be referred to by a person having ordinary skill in the art as a base transceiver station, a radio BS, an access point, a radio transceiver, a NodeB, an eNodeB (eNB), a next-generation NodeB or a giga-NodeB (either of which may be referred to as a gNB), a Home NodeB, a Home eNodeB, or other suitable terminology.

A UE 115 may include or may be referred to as a mobile device, a wireless device, a remote device, a handheld device, or a subscriber device, or some other suitable terminology, where the "device" also may be referred to as a unit, a station, a terminal, or a client, among other examples. A UE 115 also may include or may be referred to as a personal electronic device such as a cellular phone, a personal digital assistant (PDA), a tablet computer, a laptop computer, or a personal computer. In some implementations, a UE 115 may include or be referred to as a wireless local loop (WLL) station, an Internet of Things (IoT) device, an Internet of Everything (IoE) device, or a machine type communications (MTC) device, among other examples, which may be implemented in various objects such as appliances, or vehicles, meters, among other implementations.

The UEs 115 described herein may be able to communicate with various types of devices, such as other UEs 115 that may sometimes act as relays as well as the BSs 105 and the network equipment including macro eNBs or gNBs, small cell eNBs or gNBs, or relay BSs, among other implementations, as shown in FIG. 1.

The UEs 115 and the BSs 105 may wirelessly communicate with one another via one or more communication links 125 over one or more carriers. The term "carrier" may refer to a set of radio frequency spectrum resources having a defined physical layer structure for supporting the communication links 125. For example, a carrier used for a communication link 125 may include a portion of a radio frequency spectrum band (for example, a bandwidth part (BWP)) that is operated according to one or more physical layer channels for a given radio access technology (for example, LTE, LTE-A, LTE-A Pro, NR). Each physical layer channel may carry acquisition signaling (for example, synchronization signals, system information), control signaling that coordinates operation for the carrier, user data, or other signaling. The wireless communications system 100 may support communication with a UE 115 using carrier aggregation (CA) or multi-carrier operation. A UE 115 may be configured with multiple downlink component carriers and one or more uplink component carriers according to a CA configuration. CA may be used with both frequency division duplexing (FDD) and time division duplexing (TDD) component carriers.

In some implementations (for example, in a CA configuration), a carrier also may have acquisition signaling or control signaling that coordinates operations for other carriers. A carrier may be associated with a frequency channel (for example, an evolved universal mobile telecommunication system terrestrial radio access (E-UTRA) absolute radio frequency channel number (EARFCN)) and may be positioned according to a channel raster for discovery by the UEs 115. A carrier may be operated in a standalone mode where initial acquisition and connection may be conducted by the UEs 115 via the carrier, or the carrier may be operated in a non-standalone mode where a connection is anchored using a different carrier (for example, of the same or a different radio access technology).

The communication links 125 shown in the wireless communications system 100 may include uplink transmissions from a UE 115 to a BS 105, or downlink transmissions from a BS 105 to a UE 115. Carriers may carry downlink or uplink communications (for example, in an FDD mode) or may be configured to carry downlink and uplink communications (for example, in a TDD mode).

A carrier may be associated with a particular bandwidth of the radio frequency spectrum, and in some implementations the carrier bandwidth may be referred to as a "system bandwidth" of the carrier or the wireless communications system 100. For example, the carrier bandwidth may be one of a number of determined bandwidths for carriers of a particular radio access technology (for example, 1.4, 3, 5, 10, 15, 20, 40, or 80 megahertz (MHz)). Devices of the wireless communications system 100 (for example, the BSs 105, the UEs 115, or both) may have hardware configurations that support communications over a particular carrier bandwidth or may be configurable to support communications over one of a set of carrier bandwidths. In some implementations, the wireless communications system 100 may include BSs 105 or UEs 115 that support simultaneous communications via carriers associated with multiple carrier bandwidths. In some implementations, each served UE 115 may be configured for operating over portions (for example, a sub-band, a BWP) or all of a carrier bandwidth.

Signal waveforms transmitted over a carrier may be made up of multiple subcarriers (for example, using multi-carrier modulation (MCM) techniques such as orthogonal frequency division multiplexing (OFDM) or discrete Fourier transform spread OFDM (DFT-S-OFDM)). In a system employing MCM techniques, a resource element may include one symbol period (for example, a duration of one modulation symbol) and one subcarrier, where the symbol period and subcarrier spacing are inversely related. The quantity of bits carried by each resource element may depend on the modulation scheme (for example, the order of the modulation scheme, the coding rate of the modulation scheme, or both). Thus, the more resource elements that a UE 115 receives and the higher the order of the modulation scheme, the higher the data rate may be for the UE 115. A wireless communications resource may refer to a combination of a radio frequency spectrum resource, a time resource, and a spatial resource (for example, spatial layers or beams), and the use of multiple spatial layers may further increase the data rate or data integrity for communications with a UE 115.

One or more numerologies for a carrier may be supported, where a numerology may include a subcarrier spacing (Δf) and a cyclic prefix. A carrier may be divided into one or more BWPs having the same or different numerologies. In some implementations, a UE 115 may be configured with multiple BWPs. In some implementations, a single BWP for a carrier may be active at a given time and communications for the UE 115 may be restricted to one or more active BWPs.

The time intervals for the BSs 105 or the UEs 115 may be expressed in multiples of a basic time unit which may, for example, refer to a sampling period of $T_s=1/(\Delta f_{max} \cdot N_f)$ seconds, where $\Delta f_{max}$ may represent the maximum supported subcarrier spacing, and $N_f$ may represent the maximum supported discrete Fourier transform (DFT) size. Time intervals of a communications resource may be organized according to radio frames each having a specified duration (for example, 10 milliseconds (ms)). Each radio frame may be identified by a system frame number (SFN) (for example, ranging from 0 to 1023).

Each frame may include multiple consecutively numbered subframes or slots, and each subframe or slot may have the same duration. In some implementations, a frame may be divided (for example, in the time domain) into subframes, and each subframe may be further divided into a number of slots. Alternatively, each frame may include a variable number of slots, and the number of slots may depend on subcarrier spacing. Each slot may include a number of symbol periods (for example, depending on the length of the cyclic prefix prepended to each symbol period). In some wireless communications systems 100, a slot may further be divided into multiple mini-slots containing one or more symbols. Excluding the cyclic prefix, each symbol period may contain one or more (for example, $N_f$) sampling periods. The duration of a symbol period may depend on the subcarrier spacing or frequency band of operation.

A subframe, a slot, a mini-slot, or a symbol may be the smallest scheduling unit (for example, in the time domain) of the wireless communications system 100 and may be referred to as a transmission time interval (TTI). In some implementations, the TTI duration (for example, the number of symbol periods in a TTI) may be variable. Additionally, or alternatively, the smallest scheduling unit of the wireless communications system 100 may be dynamically selected (for example, in bursts of shortened TTIs (STTIs)).

Physical channels may be multiplexed on a carrier according to various techniques. A physical control channel and a physical data channel may be multiplexed on a downlink carrier, for example, using one or more of time division multiplexing (TDM) techniques, frequency division multiplexing (FDM) techniques, or hybrid TDM-FDM techniques. A control region (for example, a control resource set (CORESET)) for a physical control channel may be defined by a number of symbol periods and may extend across the system bandwidth or a subset of the system bandwidth of the carrier. One or more control regions (for example, CORESETs) may be configured for a set of the UEs 115. For example, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to a number of control channel resources (for example, control channel elements (CCEs)) associated with encoded information for a control information format having a given payload size. Search space sets may include common search space sets configured for sending control information to multiple UEs 115 and UE-specific search space sets for sending control information to a specific UE 115.

Each BS 105 may provide communication coverage via one or more cells, for example a macro cell, a small cell, a hot spot, or other types of cells, or any combination thereof. The term "cell" may refer to a logical communication entity used for communication with a BS 105 (for example, over a carrier) and may be associated with an identifier (ID) for distinguishing neighboring cells (for example, a physical cell ID (PCID), a virtual cell ID (VCID), or others). In some implementations, a cell also may refer to a geographic coverage area 110 or a portion of a geographic coverage area 110 (for example, a sector) over which the logical communication entity operates. Such cells may range from smaller areas (for example, a structure, a subset of structure) to larger areas depending on various factors such as the capabilities of the BS 105. For example, a cell may be or include a building, a subset of a building, or exterior spaces between or overlapping with geographic coverage areas 110, among other implementations.

A macro cell generally covers a relatively large geographic area (for example, several kilometers in radius) and may allow unrestricted access by the UEs 115 with service subscriptions with the network provider supporting the macro cell. A small cell may be associated with a lower-powered BS 105, as compared with a macro cell, and a small cell may operate in the same or different (for example, licensed, unlicensed) frequency bands as macro cells. Small cells may provide unrestricted access to the UEs 115 with service subscriptions with the network provider or may provide restricted access to the UEs 115 having an association with the small cell (for example, the UEs 115 in a closed subscriber group (CSG), the UEs 115 associated with users in a home or office). A BS 105 may support one or multiple cells and also may support communications over the one or more cells using one or multiple component carriers.

In some implementations, a carrier may support multiple cells, and different cells may be configured according to different protocol types (for example, MTC, narrowband IoT (NB-IoT), enhanced mobile broadband (eMBB)) that may provide access for different types of devices.

In some implementations, a BS 105 may be movable and therefore provide communication coverage for a moving geographic coverage area 110. In some implementations, different geographic coverage areas 110 associated with different technologies may overlap, but the different geographic coverage areas 110 may be supported by the same BS 105. In some other implementations, the overlapping geographic coverage areas 110 associated with different technologies may be supported by different BSs 105. The wireless communications system 100 may include, for example, a heterogeneous network in which different types of the BSs 105 provide coverage for various geographic coverage areas 110 using the same or different radio access technologies.

The wireless communications system 100 may support synchronous or asynchronous operation. For synchronous operation, the BSs 105 may have similar frame timings, and transmissions from different BSs 105 may be approximately aligned in time. For asynchronous operation, the BSs 105 may have different frame timings, and transmissions from different BSs 105 may, in some implementations, not be aligned in time. The techniques described herein may be used for either synchronous or asynchronous operations.

Some UEs 115 may be configured to employ operating modes that reduce power consumption, such as half-duplex communications (for example, a mode that supports one-way communication via transmission or reception, but not transmission and reception simultaneously). In some implementations, half-duplex communications may be performed at a reduced peak rate. Other power conservation techniques for the UEs 115 include entering a power saving deep sleep mode when not engaging in active communications, operating over a limited bandwidth (for example, according to narrowband communications), or a combination of these techniques. For example, some UEs 115 may be configured for operation using a narrowband protocol type that is associated with a defined portion or range (for example, set of subcarriers or resource blocks (RBs)) within a carrier, within a guard-band of a carrier, or outside of a carrier.

The wireless communications system 100 may be configured to support ultra-reliable communications or low-latency communications, or various combinations thereof. For example, the wireless communications system 100 may be configured to support ultra-reliable low-latency communications (URLLC) or mission critical communications. The UEs 115 may be designed to support ultra-reliable, low-latency, or critical functions (for example, mission critical functions). Ultra-reliable communications may include private communication or group communication and may be supported by one or more mission critical services such as mission critical push-to-talk (MCPTT), mission critical video (MCVideo), or mission critical data (MCData). Support for mission critical functions may include prioritization of services, and mission critical services may be used for public safety or general commercial applications. The terms ultra-reliable, low-latency, mission critical, and ultra-reliable low-latency may be used interchangeably herein.

In some implementations, a UE 115 also may be able to communicate directly with other UEs 115 over a device-to-device (D2D) communication link 135 (for example, using a peer-to-peer (P2P) or D2D protocol). One or more UEs 115 utilizing D2D communications may be within the geographic coverage area 110 of a BS 105. Other UEs 115 in such a group may be outside the geographic coverage area 110 of a BS 105 or be otherwise unable to receive transmissions from a BS 105. In some implementations, groups of the UEs 115 communicating via D2D communications may utilize a one-to-many (1-M) system in which each UE 115 transmits to every other UE 115 in the group. In some implementations, a BS 105 facilitates the scheduling of resources for D2D communications. In some other implementations, D2D communications are carried out between the UEs 115 without the involvement of a BS 105.

The core network 130 may provide user authentication, access authorization, tracking, Internet Protocol (IP) connectivity, and other access, routing, or mobility functions. The core network 130 may be an evolved packet core (EPC) or 5G core (5GC), which may include at least one control plane entity that manages access and mobility (for example, a mobility management entity (MME), an access and mobility management function (AMF)) and at least one user plane entity that routes packets or interconnects to external networks (for example, a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the BSs 105 associated with the core network 130. User IP packets may be transferred through the user plane entity, which may provide IP address allocation as well as other functions. The user plane entity may be connected to IP services 150 for one or more network operators. The IP services 150 may include access to the Internet, Intranet(s), an IP Multimedia Subsystem (IMS), or a Packet-Switched Streaming Service.

Some of the network devices, such as a BS 105, may include subcomponents such as an access network entity 140, which may be an example of an access node controller (ANC). Each access network entity 140 may communicate with the UEs 115 through one or more other access network transmission entities 145, which may be referred to as radio heads, smart radio heads, or TRPs. Each access network transmission entity 145 may include one or more antenna panels. In some configurations, various functions of each access network entity 140 or BS 105 may be distributed across various network devices (for example, radio heads and ANCs) or consolidated into a single network device (for example, a BS 105). In various implementations, a BS 105, or an access network entity 140, or a core network 130, or some subcomponent thereof, may be referred to as a network entity.

As described herein, a BS 105 may include components that are located at a single physical location or components located at various physical locations. In examples in which the BS 105 includes components that are located at various physical locations, the various components may each perform various functions such that, collectively, the various components achieve functionality that is similar to a BS 105 that is located at a single physical location. As such, a BS 105 described herein may equivalently refer to a standalone BS 105 or a BS 105 including components that are located at various physical locations or virtualized locations. In some implementations, such a BS 105 including components that are located at various physical locations may be referred to as or may be associated with a disaggregated radio access network (RAN) architecture, such as an Open RAN (O-RAN) or Virtualized RAN (VRAN) architecture. In some implementations, such components of a BS 105 may include or refer to one or more of a central unit (CU), a distributed unit (DU), or a radio unit (RU).

The wireless communications system 100 may operate using one or more frequency bands, sometimes in the range of 300 megahertz (MHz) to 300 gigahertz (GHz). Generally, the region from 300 MHz to 3 GHz is known as the ultra-high frequency (UHF) region or decimeter band because the wavelengths range from approximately one decimeter to one meter in length. The UHF waves may be blocked or redirected by buildings and environmental features, but the waves may penetrate structures sufficiently for a macro cell to provide service to the UEs 115 located indoors. The transmission of UHF waves may be associated with smaller antennas and shorter ranges (for example, less than 100 kilometers) compared to transmission using the smaller frequencies and longer waves of the high frequency (HF) or very high frequency (VHF) portion of the spectrum below 300 MHz.

The wireless communications system 100 also may operate in a super high frequency (SHF) region using frequency bands from 3 GHz to 30 GHz, also known as the centimeter band, or in an extremely high frequency (EHF) region of the spectrum (for example, from 30 GHz to 300 GHz), also known as the millimeter band. In some implementations, the wireless communications system 100 may support millimeter wave (mmW) communications between the UEs 115 and the BSs 105, and EHF antennas of the respective devices may be smaller and more closely spaced than UHF antennas. In some implementations, this may facilitate use of antenna arrays within a device. The propagation of EHF transmissions, however, may be subject to even greater atmospheric attenuation and shorter range than SHF or UHF transmissions. The techniques disclosed herein may be employed across transmissions that use one or more different frequency regions, and designated use of bands across these frequency regions may differ by country or regulating body.

The wireless communications system 100 may utilize both licensed and unlicensed radio frequency spectrum bands. For example, the wireless communications system 100 may employ License Assisted Access (LAA), LTE-Unlicensed (LTE-U) radio access technology, or NR technology in an unlicensed band such as the 5 GHz industrial, scientific, and medical (ISM) band. When operating in unlicensed radio frequency spectrum bands, devices such as the BSs 105 and the UEs 115 may employ carrier sensing for collision detection and avoidance. In some implementations, operations in unlicensed bands may be based on or associated with a CA configuration in conjunction with component carriers operating in a licensed band (for example, LAA). Operations in unlicensed spectrum may include downlink transmissions, uplink transmissions, P2P transmissions, or D2D transmissions, among other transmissions.

A BS 105 or a UE 115 may be equipped with multiple antennas, which may be used to employ techniques such as transmit diversity, receive diversity, multiple-input multiple-output (MIMO) communications, or beamforming. The antennas of a BS 105 or a UE 115 may be located within one or more antenna arrays or antenna panels, which may support MIMO operations or transmit or receive beamforming. For example, one or more BS antennas or antenna arrays may be co-located at an antenna assembly, such as an antenna tower. In some implementations, antennas or antenna arrays associated with a BS 105 may be located in diverse geographic locations. A BS 105 may have an antenna array with a number of rows and columns of antenna ports that the BS 105 may use to support beamforming of communications with a UE 115. Likewise, a UE 115 may have one or more antenna arrays that may support various MIMO or beamforming operations. Additionally, or alternatively, an antenna panel may support radio frequency beamforming for a signal transmitted via an antenna port.

The BSs 105 or the UEs 115 may use MIMO communications to exploit multipath signal propagation and increase the spectral efficiency by transmitting or receiving multiple signals via different spatial layers. Such techniques may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream and may carry bits associated with the same data stream (for example, the same codeword) or different data streams (for example, different codewords). Different spatial layers may be associated with different antenna ports used for channel measurement and reporting. MIMO techniques include single-user MIMO (SU-MIMO), where multiple spatial layers are transmitted to the same receiving device, and multiple-user MIMO (MU-MIMO), where multiple spatial layers are transmitted to multiple devices.

Beamforming, which also may be referred to as spatial filtering, directional transmission, or directional reception, is a signal processing technique that may be used at a transmitting device or a receiving device (for example, a BS 105, a UE 115) to shape or steer an antenna beam (for example, a transmit beam, a receive beam) along a spatial path between the transmitting device and the receiving device. Beamforming may be achieved by combining the signals communicated via antenna elements of an antenna array such that some signals propagating at particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (for example, with respect to the antenna array of the transmitting device or receiving device, or with respect to some other orientation).

A BS 105 or a UE 115 may use beam sweeping techniques as part of beam forming operations. For example, a BS 105 may use multiple antennas or antenna arrays (for example, antenna panels) to conduct beamforming operations for directional communications with a UE 115. Some signals (for example, synchronization signals, reference signals, beam selection signals, or other control signals) may be transmitted by a BS 105 multiple times in different directions. For example, the BS 105 may transmit a signal according to different beamforming weight sets associated with different directions of transmission. Transmissions in different beam directions may be used to identify (for example, by a transmitting device, such as a BS 105, or by a receiving device, such as a UE 115) a beam direction for later transmission or reception by the BS 105.

Some signals, such as data signals associated with a particular receiving device, may be transmitted by a BS 105 in a single beam direction (for example, a direction associated with the receiving device, such as a UE 115). In some implementations, the beam direction associated with transmissions along a single beam direction may be determined based on or in accordance with a signal that was transmitted in one or more beam directions. For example, a UE 115 may receive one or more of the signals transmitted by the BS 105 in different directions and may report to the BS 105 an indication of the signal that the UE 115 received with a highest signal quality or an otherwise acceptable signal quality.

In some implementations, transmissions by a device (for example, by a BS 105 or a UE 115) may be performed using multiple beam directions, and the device may use a combination of digital precoding or radio frequency beamforming to generate a combined beam for transmission (for example, from a BS 105 to a UE 115). The UE 115 may report feedback that indicates precoding weights for one or more beam directions, and the feedback may correspond to a configured number of beams across a system bandwidth or one or more sub-bands. The BS 105 may transmit a reference signal (for example, a cell-specific reference signal (CRS), a channel state information reference signal (CSI-RS)), which may be precoded or unprecoded. The UE 115 may provide feedback for beam selection, which may be a precoding matrix indicator (PMI) or codebook-based feedback (for example, a multi-panel type codebook, a linear combination type codebook, a port selection type codebook). Although these techniques are described with reference to signals transmitted in one or more directions by a BS 105, a UE 115 may employ similar techniques for transmitting signals multiple times in different directions (for example, for identifying a beam direction for subsequent transmission or reception by the UE 115) or for transmitting a signal in a single direction (for example, for transmitting data to a receiving device).

A receiving device (for example, a UE 115) may try multiple receive configurations (for example, directional listening) when receiving various signals from the BS 105, such as synchronization signals, reference signals, beam selection signals, or other control signals. For example, a receiving device may try multiple receive directions by receiving via different antenna subarrays, by processing received signals according to different antenna subarrays, by receiving according to different receive beamforming weight sets (for example, different directional listening weight sets) applied to signals received at multiple antenna elements of an antenna array, or by processing received signals according to different receive beamforming weight sets applied to signals received at multiple antenna elements of an antenna array, any of which may be referred to as "listening" according to different receive configurations or receive directions. In some implementations, a receiving device may use a single receive configuration to receive along a single beam direction (for example, when receiving a data signal). The single receive configuration may be aligned in a beam direction determined based on or in accordance with listening according to different receive configuration directions (for example, a beam direction determined to have a highest signal strength, highest signal-to-noise ratio (SNR), or otherwise acceptable signal quality based on or associated with listening according to multiple beam directions).

The wireless communications system 100 may be a packet-based network that operates according to a layered protocol stack. In the user plane, communications at the bearer or Packet Data Convergence Protocol (PDCP) layer may be IP-based. A Radio Link Control (RLC) layer may perform packet segmentation and reassembly to communicate over logical channels. A Medium Access Control (MAC) layer may perform priority handling and multiplexing of logical channels into transport channels. The MAC layer also may use error detection techniques, error correction techniques, or both to support retransmissions at the MAC layer to improve link efficiency. In the control plane, the Radio Resource Control (RRC) protocol layer may provide establishment, configuration, and maintenance of an RRC connection between a UE 115 and a BS 105 or a core network 130 supporting radio bearers for user plane data. At the physical layer, transport channels may be mapped to physical channels.

The UEs 115 and the BSs 105 may support retransmissions of data to increase the likelihood that data is received successfully. Hybrid automatic repeat request (HARQ) feedback is one technique for increasing the likelihood that data is received correctly over a communication link 125. HARQ may include a combination of error detection (for example, using a cyclic redundancy check (CRC)), forward error correction (FEC), and retransmission (for example, automatic repeat request (ARQ)). HARQ may improve throughput at the MAC layer in poor radio conditions (for example, low signal-to-noise conditions). In some implementations, a device may support same-slot HARQ feedback, where the device may provide HARQ feedback in a specific slot for data received in a previous symbol in the slot. In some other implementations, the device may provide HARQ feedback in a subsequent slot, or according to some other time interval.

In some systems, such as the wireless communications system 100, a UE 115 may communicate with multiple TRPs in a multi-TRP deployment. For example, the UE 115 may communicate with (such as transmit signaling to or receive signaling from, or both) a first TRP and a second TRP. In some aspects, the UE 115 may support directional communication and may focus transmission or reception of signaling in one of various directions in accordance with a configuration for directional communication. Such a configuration for directional communication may include or refer to beamforming configurations according to which the UE 115 may focus a transmission or reception in accordance with constructive interference associated with over-the-air signaling, where different directions of constructive interference may be associated with or referred to as different directional beams. In such aspects, different configurations for directional communication may refer to the use of different directional communication beams and, accordingly, a configuration for directional communication may be equivalently referred to herein as or otherwise associated with a directional communication beam or beam pair.

In examples in which the UE 115 supports directional communication in a multi-TRP deployment, the UE 115 may communicate with different TRPs using different configurations for directional communication (for example, using different beams). The UE 115 may be configured with single DCI-based multiple TRP operation, or configured with multiple DCI-based multiple TRP (i.e., multi-DCI based multi-TRP) operation. For single DCI-based multiple TRP operation, a single DCI may be applied to schedule transmissions or receptions associated with multiple TRPs. In other words, for example, the UE 115 may receive a single DCI message from one or more components of a BS 105 or a TRP scheduling communication between the UE 115 and multiple TRPs. For multiple DCI-based multiple TRP operation, multiple DCIs may be applied to schedule transmissions or receptions associated with the multiple respective TRPs. In other words, for example, the UE 115 may receive multiple DCI messages from one or more components of a BS 105 or a TRP (or multiple TRPs) scheduling communication between the UE 115 and multiple TRPs.

The UE 115 may be explicitly configured with or, based on a rule, implicitly select, identify, obtain, or otherwise determine multiple sets of reference signals for BFD (such as multiple BFD reference signal (BFD-RS) sets) where multiple sets of reference signals may be associated with the multiple TRPs. The UE 115 may be explicitly configured with multiple sets of candidate reference signals for new beam identification (NBI), which may be referred to herein as multiple NBI reference signal (NBI-RS) sets, where the multiple sets of candidate reference signals may be associated with the multiple TRPs. To maintain reliable communication between the UE 115 and the multiple TRPs, each of the multiple TRPs may transmit one or more reference signals associated with BFD and the UE 115 may measure the one or more reference signals and compare a measured signal quality (such as an SNR measurement, a signal-to-interference-plus-noise ratio (SINR) measurement, a reference signal receive power (RSRP) measurement, or an error rate measurement, among other examples) associated with the one or more reference signals to a signal quality threshold.

If the UE 115 measures that reference signals from one TRP consistently or persistently fail to satisfy the threshold, the UE 115 may declare a beam failure (such as a link failure) for that TRP. For example, as part of a BFD procedure, the UE 115 may maintain a beam failure indicator (BFI) count at the UE 115 and may increment the BFI count in accordance with measuring that the reference signals from the one TRP fail to satisfy the threshold. If the BFI count satisfies (such as meets or exceeds) a threshold count prior to an expiration of a BFD timer, the UE 115 may declare the beam failure for that TRP. In some aspects, the UE 115 may receive an indication of the threshold count from one or more components of the BS 105 or a TRP. For example, the UE 115 may receive an indication of the threshold count via RRC signaling, such as via a beamFailureInstanceMaxCount parameter. In some systems, the UE 115 may lack a signaling mechanism or BFR MAC-CE format for providing complete channel information for multi-TRP deployments (such as beam failure status information for each of the multiple TRPs with which the UE 115 communicates), which may introduce latency in beam failure reporting and potentially reduce reliability as a network entity receiving an indication of the BFD from the UE 115 may lack insight on beam failure statuses for more than one TRP.

In some implementations, the UE 115 may support a signaling mechanism, including one or multiple BFR MAC-CE formats, according to which the UE 115 may report, via a single message, beam failure information for the multiple TRPs with which the UE 115 communicates. For example, the UE 115 may include, in the BFR MAC-CE, a status indicator and the UE 115 may set different values or codepoints for the status indicator to indicate a beam failure status for each if not all of the multiple TRPs with which the UE 115 communicates and what other information the UE 115 reports via the BFR MAC-CE. Such other information that the UE 115 reports via the BFR MAC-CE may include an ID of a candidate reference signal for any TRPs for which the UE 115 detected a beam failure. The UE 115 may generate the BFR MAC-CE including the status indicator, and in accordance with the information indicated to be carried within the BFR MAC-CE by the status indicator, and may transmit the BFR MAC-CE to a network entity. Such a network entity may include one or more components of a BS 105, one or more of the TRPs with which the UE 115 communicates, or any other network-interfacing device in the wireless communications system 100.

Figure 2:
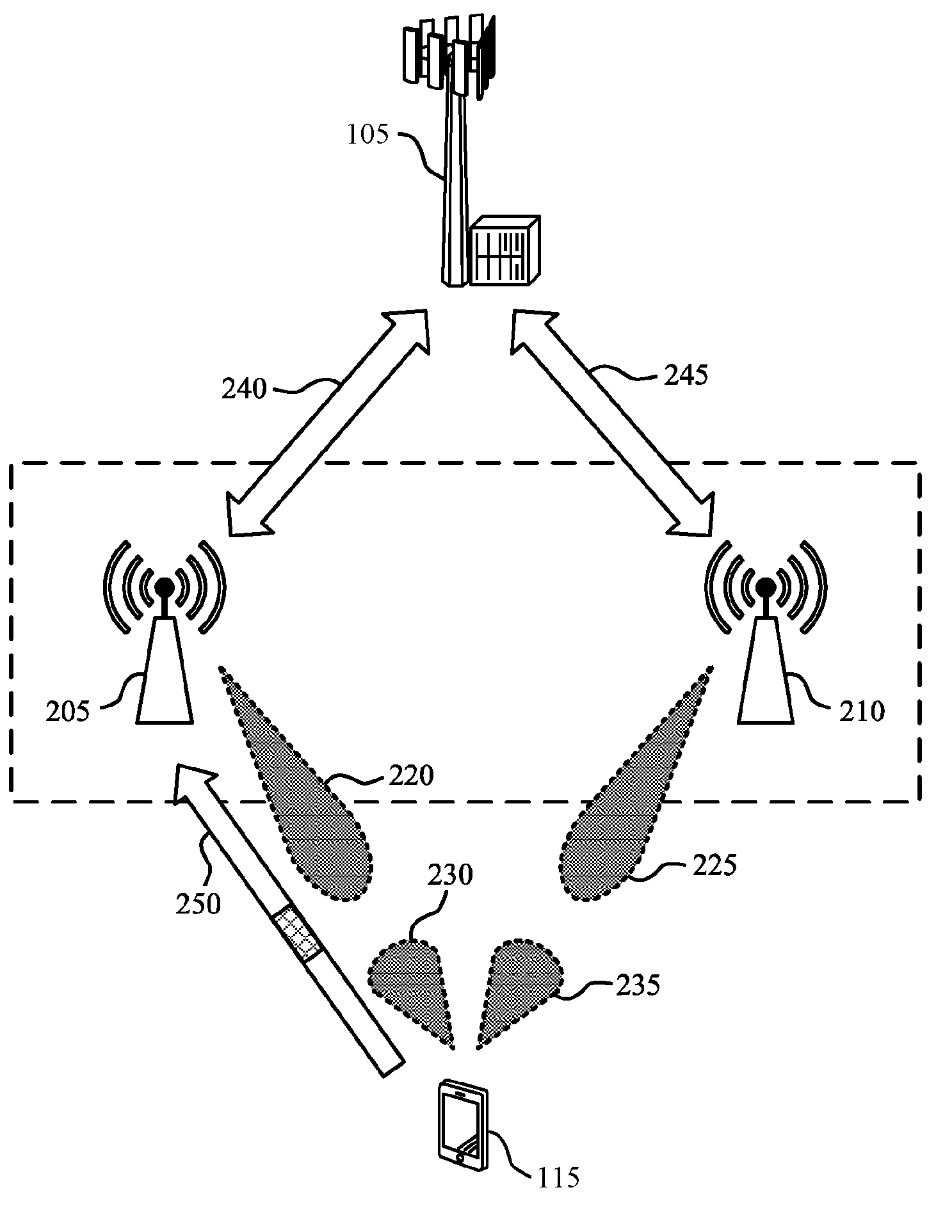
FIG. 2 illustrates an example signaling diagram that supports per-TRP beam failure reporting.
Figure 2:

FIG. 2 illustrates an example signaling diagram 200 that supports per-TRP beam failure reporting. The signaling diagram 200 may implement or be implemented to realize aspects of the wireless communications system 100. For example, the signaling diagram 200 illustrates communication between a UE 115, one or more components of a BS 105, a TRP 205, and a TRP 210. The UE 115 of FIG. 2 may be an example of a UE 115 as illustrated by and described with reference to FIG. 1. The one or more components of a BS 105 of FIG. 2 may be examples of one or more components of a BS 105 as illustrated by and described with reference to FIG. 1 and may include or refer to components that are co-located with each other or that are distributed, such as in a disaggregated RAN or virtualized RAN architecture. The TRP 205 and the TRP 210 of FIG. 2 may be examples of TRPs as illustrated by and described with reference to FIG. 1. In some implementations, the UE 115 may transmit a control signal 215 including a beam failure status for the TRP 205 and the TRP 210 and indicating whether the UE 115 reports a candidate reference signal for any TRPs identified as having a beam failure.

For example, the UE 115 may support a format according to which the UE 115 may use a single control signal 215 (which may be an example of or include a BFR MAC-CE) for a BFR request for each if not all TRPs in each if not all component carriers in a cell group. As such, the UE 115 may measure one or multiple reference signals, such as BFD-RSs, from each of the TRP 205 and the TRP 210 to monitor a beam status (such as a beam failure status) for both of the TRP 205 and the TRP 210. For example, the UE 115 may communicate with (transmit to or receive from) the TRP 205 in accordance with a first configuration for directional communication according to which the UE 115 focuses transmissions to, or reception from, the TRP 205 using a beam 230 and according to which the TRP 205 focuses transmissions to, or reception from, the UE 115 using a beam 220. In such examples, the TRP 205 may transmit BFD-RSs to the UE 115 via the beam 220 and the UE 115 may perform one or more measurements (such as an SNR measurement, an SINR measurement, an RSRP measurement, or an error rate measurement, among other examples) using the BFD-RSs transmitted via the beam 220.

Similarly, the UE 115 may communicate with (transmit to or receive from) the TRP 210 in accordance with a second configuration for directional communication according to which the UE 115 focuses transmissions to, or reception from, the TRP 210 using a beam 235 and according to which the TRP 210 focuses transmissions to, or reception from, the UE 115 using a beam 225. In such examples, the TRP 210 may transmit BFD-RSs to the UE 115 via the beam 225 and the UE 115 may perform one or more measurements (such as an SNR measurement, an SINR measurement, an RSRP measurement, or an error rate measurement, among other examples) using the BFD-RSs transmitted via the beam 225. As such, the UE 115 may track signal quality for both the TRP 205 (and the beam 220) and the TRP 210 (and the beam 225) and, if a signal quality of one or both of the TRP 205 and the TRP 210 satisfies a criteria for BFD, the UE 115 may generate and transmit the control signal 215 to a network entity.

Such a control signal 215 may include indices of a failed BFD-RS set as an indication of a failed link between the UE 115 and a specific TRP. Further, the control signal 215 may include indices of a component carrier including the failed TRP link, an indicator associated with whether a new candidate beam is identified or reported in an NBI-RS set associated with the failed BFD-RS set, and a resource indicator representing the new candidate beam (if identified) in accordance with a number of NBI-RS resources in a corresponding NBI-RS set. The control signal 215 may further include information or the UE 115 may transmit the control signal 215 in accordance with a context (such as a deployment scenario) associated with MAC-CEs related to a special cell (SpCell) if the UE 115 transmits the control signal 215 via a message 3 (msg3) or a message A (msgA) as part of a random access procedure.

In some implementations, the UE 115 may report information to the network entity during BFR and such information may indicate if the UE 115 is able or unable to find a new candidate beam to report for an identified BFD (as a potential replacement for the failed beam, for example). In other words, the UE 115 may report such information if the UE 115 is able or unable to identify any reference signal with an RSRP that satisfies a threshold (such as any reference signal in a candidate BeamRSSCellList having an RSRP that is greater than an rsrp-ThresholdBER parameter). In some aspects, the UE 115 may configure the reported beam information as one or more of a transmission configuration indicator (TCI) state ID, a CSI-RS ID in a specific BWP (such as an active BWP), or a joint ID for a synchronization signal block (SSB) and for a CSI-RS ID. In some aspects, a reference signal for an additional beam (such as an additional reference signal) reported by the UE 115 via such information may be or may not be in the candidate BeamRSSCellList and, if the additional reference signal is in the candidateBeamRSSCellList, the UE 115, one or more components of the BS 105, the TRP 205, or the TRP 210 may expect that an RSRP of the additional reference signal is below the rsrp-ThresholdBFR parameter.

To support a reporting of such information during BFR in a multi-TRP deployment scenario, the UE 115, one or more components of the BS 105, the TRP 205, and the TRP 210 may support one or more formats for the control signal 215 that enable the UE 115 to convey BFR information for multiple TRPs. For example, the control signal 215 may include a $C_i$ field and the $C_i$ field may indicate that a cell-specific beam failure is detected in a cell (such as in cell $C_i$) or that at least one TRP-specific beam failure is detected in the cell (such as in the cell $C_i$). For example, the $C_i$ field may include one bit and if $C_i$ is set to 1, the $C_i$ field may indicate a presence of at least one octet in the control signal 215 to convey BFR information for the cell, which includes a field associated with a reporting of a candidate reference signal (such as an AC field or a status indicator field) for the cell (which may be an example of a secondary cell (SCell)) with ServCellIndex i.

As such, in some implementations, if the $C_i$ field is set to 1 and if per-TRP beam failure reporting is configured for the cell $C_i$ or for a component carrier on which the UE 115 communicates with the TRP 205 and the TRP 210, the UE 115 may include a status indicator field in the control signal 215 to indicate a per-TRP BFR status. In other words, the UE 115 may include the status indicator field in the control signal 215 to indicate which TRP (such as one or both of the TRP 205 and the TRP 210) has a detected beam failure in the cell $C_i$. Further, the UE 115 may include the status indicator field to indicate an existence, in the control signal 215, of a candidate reference signal ID corresponding to any TRPs identified as having a detected beam failure.

In some aspects, and as illustrated by and described in more detail with reference to FIGS. 3 and 4, the status indicator field also may implicitly or explicitly indicate a format of the control signal 215. For example, if the status indicator field indicates that at least one candidate reference signal ID is reported in the control signal 215, the control signal 215 may include two octets for the serving cell $C_i$. Otherwise, the control signal 215 may include one octet for the serving cell $C_i$. The UE 115 may allocate up to four bits for the status indicator. In some implementations, and as illustrated by and described in more detail with reference to FIG. 3, the UE 115 may allocate three bits for the status indicator. In some other implementations, and as illustrated by and described in more detail with reference to FIG. 4, the UE 115 may allocate four bits for the status indicator.

The UE 115 also may include, in the control signal 215 for each $C_i$ set to 1 and for which at least one candidate reference signal ID is reported in the control signal 215, one or more "candidate reference signal ID" fields. In some aspects, such "candidate reference signal ID" fields may be denoted or referred to as "candidate RSi ID" fields, where different values for i indicate for which TRP the candidate reference signal is reported or indicate some other information associated with that reported candidate reference signal (such as some other information associated with identifying that reported candidate reference signal or identifying the TRP for which that candidate reference signal is reported).

In some aspects, if one TRP is indicated with beam failure, one of the multiple "candidate reference signal ID" fields in the control signal 215 (such as the first field) may be used, and the candidate reference signal, if indicated as reported in the field, may correspond to an NBI-RS of the TRP with beam failure. In some other aspects, if one TRP is indicated with beam failure, one of the multiple "candidate reference signal ID" fields in the control signal 215 (such as the field corresponding to the TRP with beam failure) may be used, and the candidate reference signal, if indicated as reported in the field, may correspond to an NBI-RS of the TRP with beam failure. In some aspects, if both TRPs (such as both the TRP 205 and the TRP 210) are indicated with beam failure, two "candidate reference signal ID" fields may be used in the control signal 215, and the candidate reference signals, if indicated as reported in the fields, may correspond to NBI-RSs of the multiple TRP with beam failure in a predetermined order. For example, a first listed candidate reference signal may correspond to an NBI-RS for the TRP 205 and a second listed candidate reference signal may correspond to an NBI-RS for the TRP 210, or vice versa, in accordance with the predetermined order.

For example, the UE 115 may include a "candidate RS1 ID" field, a "candidate RS2 ID" field, or a "candidate RSi ID" field, or any combination thereof, in the control signal 215. In some implementations, if the UE 115 reports a candidate reference signal for one TRP (such as one of the TRP 205 or the TRP 210), the UE 115 may report the candidate reference signal as candidate RSi ID and may indicate the TRP ID associated with the reported candidate reference signal via the status indicator field. In some other implementations, if the UE 115 reports a candidate reference signal for both the TRP 205 and the TRP 210, the UE 115 may report a first candidate reference signal for the TRP 205 as candidate RS1 ID and may report a second candidate reference signal for the TRP 210 as candidate RS2 ID and may indicate the TRP IDs via the status indicator field.

The UE 115 may generate and transmit the control signal 215 accordingly. In some aspects, and as shown in FIG. 2, the UE 115 may transmit the control signal 215 to the TRP 205 via a communication link 250. Further, although shown as transmitting the control signal 215 to the TRP 205, the UE 115 may equivalently transit the control signal 215 to any other network entity, such as any one or more of the TRP 210 or one or more components of the BS 105. The TRP 205 may communicate with one or more components of the BS 105 or the TRP 210, or both, and, in some aspects, may forward the control signal 215, or information associated with the control signal 215, to one or more components of the BS 105 or the TRP 210, or both. For example, the TRP 205 may communicate with one or more components of the BS 105 via a communication link 240 and the TRP 210 may communicate with one or more components of the BS 105 via a communication link 245. Further, although communication links between the TRP 205 and one or more components of the BS 105 and between the TRP 210 and one or more components of the BS 105, the TRP 205 and the TRP 210 may additionally, or alternatively, communicate with each other directly via a wired or wireless link.

As such, one or more network entities may obtain the information in the control signal 215 relating to per-TRP beam failure status reporting and may re-configure directional communication between the UE 115 and any TRPs reported as having a detected beam failure using the information in the control signal 215. For example, if the UE 115 reports that the TRP 210 has a detected beam failure (such that the beam 225 from the TRP 210 is no longer providing a sufficient signal quality to the UE 115) and includes a candidate reference signal ID for the TRP 210 in the control signal 215, one or more network entities may re-configure the directional communication between the UE 115 and the TRP 210 such that the TRP 210 uses a directional beam associated with the reported candidate reference signal ID. Alternatively, if the UE 115 reports that the TRP 210 has a detected beam failure (such that the beam 225 from the TRP 210 is no longer providing a sufficient signal quality to the UE 115) and does not include a candidate reference signal ID for the TRP 210 in the control signal 215, one or more network entities may re-configure the directional communication between the UE 115 and the TRP 210 via a beam sweeping procedure or any other procedure according to which the UE 115 and the TRP 210 may re-establish a reliable communication link.

Figure 3:
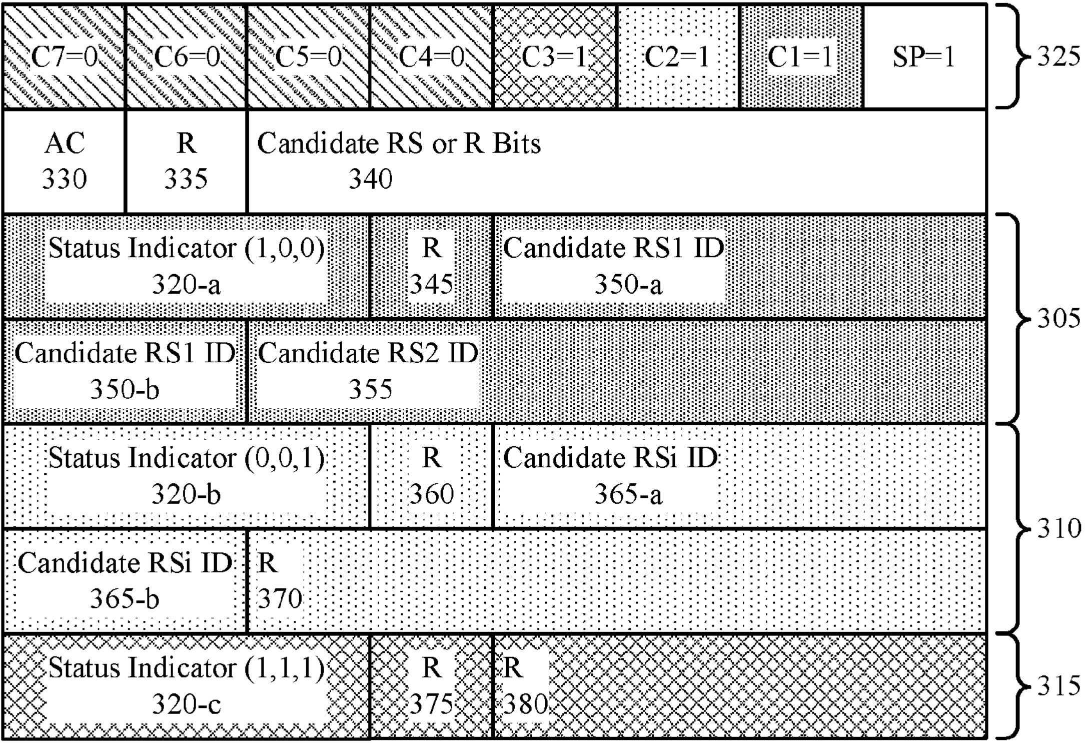
FIGS. 3-5 illustrate example control signals that support per-TRP beam failure reporting.

FIG. 3 illustrates an example control signal 300 that supports per-TRP beam failure reporting. The control signal 300 may implement or be implemented to realize one or more aspects of the wireless communications system 100 or the signaling diagram 200. For example, a UE 115 may generate and transmit, to a network entity, the control signal 300 as a result of or otherwise associated with a BFD for at least one of multiple TRPs with which the UE 115 communicates. Such a UE 115 may be an example of a UE 115 as illustrated by and described with reference to FIGS. 1 and 2. Such a network entity may be an example of one or more components of a BS 105 or a TRP with which the UE 115 communicates as illustrated by and described with reference to FIGS. 1 and 2. In some implementations, the UE 115 may include a status indicator field 320 (such as one or more of a status indicator field 320-*a*, a status indicator field 320-*b*, or a status indicator field 320-*c* such that a "status indicator field 320" may refer to any one or more of the status indicator field 320-*a*, the status indicator field 320-*b*, or the status indicator field 320-*c*) of three bits (such as B1, B2, B3) in the control signal 300 and different status indicators may indicate that the UE 115 reports different BFR information via the control signal 300. In some aspects, the control signal 300 may be an example of the control signal 215 illustrated by and described with reference to FIG. 2.

The control signal 300 may be an example of a BFR MAC-CE featuring a format that is capable of supporting per-TRP beam failure statuses and optionally candidate reference signal IDs for any TRPs for which the UE 115 detects a beam failure for a given cell or component carrier. For example, a first octet 325 of the control signal 300 (which may be a top-most octet of the control signal 300) may include eight bits, each bit corresponding to a different cell $C_i$ and a value of each bit indicating whether the control signal 300 includes BFR information for TRPs on that cell $C_i$. For illustrative and explanatory purposes, the control signal 300 is shown as including BFR information for an SpCell (illustrated as "SP" in FIG. 3), a cell $C_1$, a cell $C_2$, and a cell $C_3$. Further, although shown as including BFR information for multiple cells, the UE 115 may, in some aspects, include BFR information for a single cell or component carrier in one control signal 300.

As shown in FIG. 3, the UE 115 may refrain from including a status indicator field for the SpCell and may instead include an AC field 330, a reserved bit (R) 335, and either a candidate reference signal ID or a set of reserved bits 340 with which the UE 115 is capable of reporting BFR information for a BS 105 or for one TRP. For the cell $C_1$, the cell $C_2$, and the cell $C_3$, the UE 115 may include the status indicator field 320-*a*, the status indicator field 320-*b*, and the status indicator field 320-*c*, respectively. The UE 115, using a status indicator field 320 (any one or more of the status indicator field 320-*a*, the status indicator field 320-*b*, or the status indicator field 320-*c*), may indicate a beam failure status for each of two different TRPs with which the UE 115 communicates and indicate an existence of a reported candidate reference ID for any TRPs for which the UE 115 detects a beam failure. For example, the UE 115 may communicate with a first TRP and a second TRP and may indicate, via the status indicator field 320 (any one or more of the status indicator field 320-*a*, the status indicator field 320-*b*, or the status indicator field 320-*c*), a per-TRP beam failure status for the first TRP and the second TRP (such as a first beam failure status for the first TRP and a second beam failure status for the second TRP).

In some implementations, the UE 115 may set a codepoint (such as a permutation of values for the three bits included in one or more of the status indicator field 320-*a*, the status indicator field 320-*b*, or the status indicator field 320-*c*) for the status indicator and each different possible codepoint for the status indicator may map to a specific combination of BFD or a lack of BFD and candidate reference signal reporting or a lack of candidate reference signal reporting for each of the TRPs with which the UE 115 communicates. Further, in some implementations, some codepoints may be associated with different formats of the control signal 300. For example, the status indicator field 320 (any one or more of the status indicator field 320-*a*, the status indicator field 320-*b*, or the status indicator field 320-*c*) may indicate, for a corresponding cell $C_i$ and in accordance with a codepoint of the status indicator, one of a format 305, a format 310, or a format 315.

The format 305 may be associated with a BFD for both of the first TRP and the second TRP and reporting of a candidate reference signal ID for each of the first TRP and the second TRP. The format 310 may be associated with a BFD for one of the first TRP or the second TRP and reporting of a candidate reference signal ID for the one of the first TRP or the second TRP for which beam failure is detected. The format 315 may be associated with a BFD for at least one of the first TRP or the second TRP without reporting of candidate reference signal IDs. Further, and as shown in FIG. 3, the format 305 and the format 310 may be associated with two octets of the control signal 300 and the format 315 may be associated with one octet of the control signal 300.

As such, different codepoints for the status indicator may map to different specific combinations of BFD and candidate reference signal reporting and some codepoints may be associated with different formats. For example, the UE 115 and the network entity receiving the control signal 300 may map different codepoints to different specific combinations and to different formats in accordance with the example mapping shown in Table 1, where the first TRP may be denoted as TRP1 and the second TRP may be denoted as TRP2.

TABLE 1

| Status Indicator (B1, B2, B3) | TRP2 BFR with Candidate RS2 | TRP2 Not BFR | TRP2 BFR without Candidate RS2 |
|---|---|---|---|
| TRP1 BFR with Candidate RS1 | (1, 0, 0) - RS1/RS2 ID, Format 305 | (0, 0, 1) - RS1 ID, Format 310 | (1, 0, 1) - RS1 ID, Format 310 |
| TRP1 Not BFR | (0, 1, 1) - RS2 ID, Format 310 | 0 or N/A | (0, 1, 0) - 0RS ID, Format 315 |
| TRP1 BFR without Candidate RS1 | (1, 1, 0) - RS2 ID, Format 310 | (0, 0, 0) - 0RS ID, Format 315 | (1, 1, 1) - 0RS ID, Format 315 |

As shown in Table 1, different codepoints of the (B1, B2, B3) bits of the status indicator may map to different combinations of BFD or BFR for each of the first TRP and the second TRP and whether the control signal 300 also includes candidate reference signal reporting for the first TRP and the second TRP. For example, with a status indicator (B1, B2, B3) of (1,0,0) in the status indicator field 320-*a*, the UE 115 may indicate that beam failure is detected (and that BFR is requested) for both of the first TRP and the second TRP, that the control signal 300 includes a first candidate reference signal (RS1) for the first TRP and a second candidate reference signal (RS2) for the second TRP, and that the control signal 300 is associated with the format 305. In such examples, a first octet including the BFR information may include the status indicator in the status indicator field 320-*a*, a reserved bit 345, and a first portion of the candidate RS1 ID 350-*a* and a second octet including the BFR information may include a second portion of the candidate RS1 ID 350-*b* and the candidate RS2 ID 355.

In a further example, with a status indicator (B1, B2, B3) of (0,0,1) in the status indicator field 320-*b*, the UE 115 may indicate that beam failure is detected (and that BFR is requested) for the first TRP and that beam failure is not detected for the second TRP, that the control signal 300 includes a first candidate reference signal (RS1) for the first TRP and does not include a second candidate reference signal (RS2) for the second TRP, and that the control signal 300 is associated with the format 310. In such examples, a first octet including the BFR information may include the status indicator in the status indicator field 320-*b*, a reserved bit 360, and a first portion of a candidate RSi ID 365-*a* (such as the RS1 ID) and a second octet including the BFR information may include a second portion of the candidate RSi ID 365-*b* (such as the RS1 ID) and a number of reserved bits 370. In a further example, with a status indicator (B1, B2, B3) of (1,1,1) in the status indicator field 320-*c*, the UE 115 may indicate that beam failure is detected (and that BFR is requested) for both of the first TRP and the second TRP, that there is no reporting of candidate reference signals for either of the first TRP or the second TRP in the control signal 300, and that the control signal 300 is associated with the format 315. In such examples, a first (and only) octet including BFR information may include the status indicator in the status indicator field 320-*c*, a reserved bit 375, and a number of other reserved bits 380.

In some implementations, the example mapping shown by Table 1 may be pre-configured, pre-loaded, or equipped at the UE 115. Additionally, or alternatively, the UE 115 receive an indication of the example mapping. In some implementations, the UE 115 may receive the indication of the example mapping from a network entity, including one or more components of a BS 105, the first TRP, or the second TRP.

Figure 4:
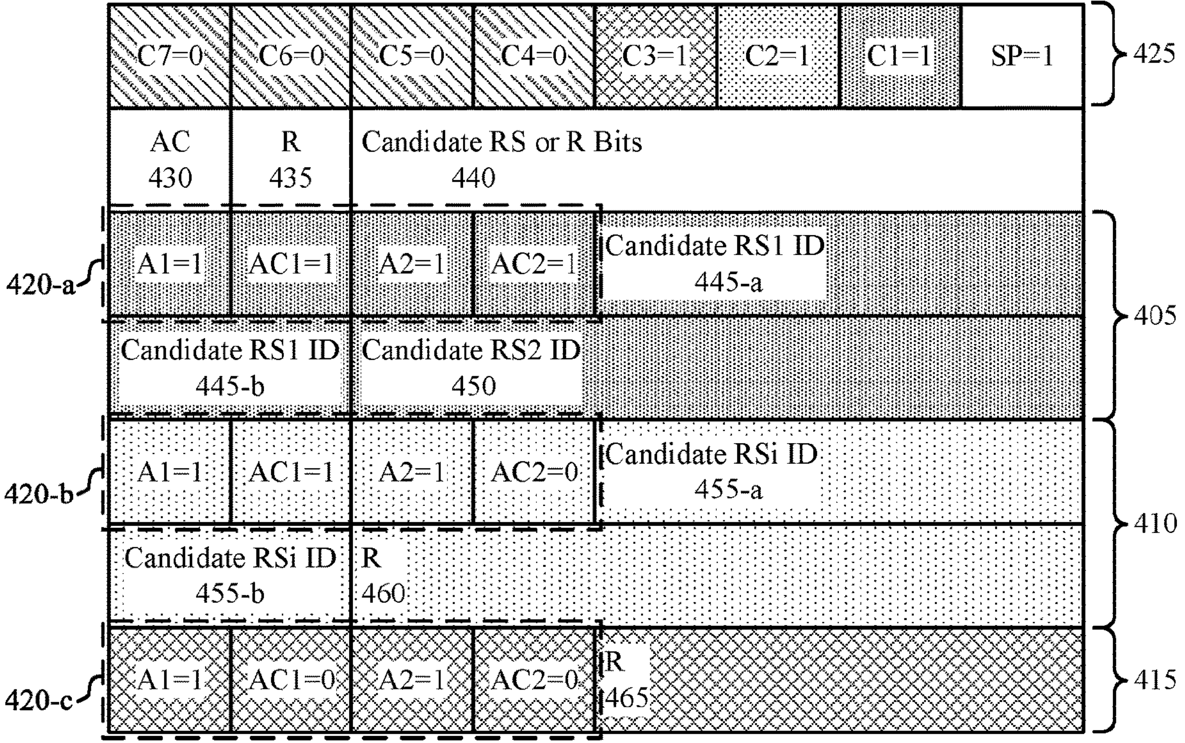

FIG. 4 illustrates an example control signal 400 that supports per-TRP beam failure reporting. The control signal 400 may implement or be implemented to realize one or more aspects of the wireless communications system 100 or the signaling diagram 200. For example, a UE 115 may generate and transmit, to a network entity, the control signal 400 as a result of or otherwise associated with a BFD for at least one of multiple TRPs with which the UE 115 communicates. Such a UE 115 may be an example of a UE 115 as illustrated by or described with reference to FIGS. 1-3. Such a network entity may be an example of one or more components of a BS 105 or a TRP with which the UE 115 communicates as illustrated by or described with reference to FIGS. 1-3. In some implementations, the UE 115 may include a status indicator field 420 (such as one or more of a status indicator field 420-*a*, a status indicator field 420-*b*, or a status indicator field 420-*c* such that a "status indicator field 420" may refer to any one or more of the status indicator field 420-*a*, the status indicator field 420-*b*, or the status indicator field 420-*c*) of four bits (A1, AC1, A2, AC2) in the control signal 400 and different status indicators may indicate that the UE 115 reports different BFR information via the control signal 400. In some aspects, the control signal 400 may be an example of the control signal 215 illustrated by and described with reference to FIG. 2.

The control signal 400 may be an example of a BFR MAC-CE featuring a format that is capable of supporting per-TRP beam failure statuses and optionally candidate reference signal IDs for any TRPs for which the UE 115 detects a beam failure for a given cell or component carrier. For example, a first octet 425 of the control signal 400 (which may be a top-most octet of the control signal 400) may include eight bits, each bit corresponding to a different cell $C_i$ and a value of each bit indicating whether the control signal 400 includes BFR information for TRPs on that cell $C_i$. For illustrative and explanatory purposes, the control signal 400 is shown as including BFR information for an SpCell (illustrated as "SP" in FIG. 4), a cell $C_1$, a cell $C_2$, and a cell $C_3$. Further, although shown as including BFR information for multiple cells, the UE 115 may, in some aspects, include BFR information for a single cell or component carrier in one control signal 400.

As shown in FIG. 4, the UE 115 may refrain from including a status indicator field for the SpCell and may instead include an AC field 430, a reserved bit 435, and either a candidate reference signal ID or a set of reserved bits 440 with which the UE 115 is capable of reporting BFR information for a BS 105 or for one TRP. For the cell $C_1$, the cell $C_2$, and the cell $C_3$, the UE 115 may include the status indicator field 420-*a*, the status indicator field 420-*b*, and the status indicator field 420-*c*, respectively. The UE 115, using a status indicator field 420 (any one or more of the status indicator field 420-*a*, the status indicator field 420-*b*, or the status indicator field 420-*c*), may indicate a beam failure status for each of two different TRPs with which the UE 115 communicates and indicate an existence of a reported candidate reference ID for any TRPs for which the UE 115 detects a beam failure. For example, the UE 115 may communicate with a first TRP and a second TRP and may indicate, via the status indicator field 420 (any one or more of the status indicator field 420-*a*, the status indicator field 420-*b*, or the status indicator field 420-*c*), a per-TRP beam failure status for the first TRP and the second TRP (such as a first beam failure status for the first TRP and a second beam failure status for the second TRP).

In some implementations, the UE 115 may set a codepoint (such as a permutation of values for the four bits included in one or more of the status indicator field 420-*a*, the status indicator field 420-*b*, or the status indicator field 420-*c*) for the status indicator and each bit of the four bit status indicator may convey information associated with one of a BFD or a lack of BFD for the first TRP, a BFD or a lack of BFD for the second TRP, an existence of candidate reference signal reporting for the first TRP, or an existence of candidate reference signal reporting for the second TRP. For example, a first bit (such as A1) may indicate a BFD or a lack of BFD for the first TRP, a second bit (such as AC1) may indicate a candidate reference signal reporting or a lack of candidate reference signal reporting for the first TRP, a third bit (such as A2) may indicate a BFD or a lack of BFD for the second TRP, and a fourth bit (such as AC2) may indicate a candidate reference signal reporting or a lack of candidate reference signal reporting for the second TRP.

In other words, for a four-bit status indicator including bits (A1, AC1, A2, AC2), A1=1 may indicate that the first TRP has a BFR and A1=0 may indicate that the first TRP has no BFR. If A1=1, AC1=1 may indicate that the UE 115 reports a candidate reference signal for the first TRP. Alternatively, AC1=0 may indicate that the UE 115 does not report a candidate reference signal for the first TRP. If A1=0, AC1 may be or function as a reserved bit or may be set equal to 0 as a default. Similarly, A2=1 may indicate that the second TRP has a BFR and A2=0 may indicate that the second TRP has no BFR. If A2=1, AC2=1 may indicate that the UE 115 reports a candidate reference signal for the second TRP. Alternatively, AC2=0 may indicate that the UE 115 does not report a candidate reference signal for the second TRP. If A2=0, AC2 may be or function as a reserved bit or may be set equal to 0 as a default.

Further, in some implementations, some codepoints may be associated with different formats of the control signal 400. For example, the status indicator field 420 (any one or more of the status indicator field 420-*a*, the status indicator field 420-*b*, or the status indicator field 420-*c*) may indicate, for a corresponding cell $C_i$ and in accordance with a codepoint of the status indicator, one of a format 405, a format 410, or a format 415. The format 405 may be associated with a BFD for both of the first TRP and the second TRP and reporting of a candidate reference signal ID for each of the first TRP and the second TRP. The format 410 may be associated with a BFD for one of the first TRP or the second TRP and reporting of a candidate reference signal ID for the one of the first TRP or the second TRP for which beam failure is detected. The format 415 may be associated with a BFD for at least one of the first TRP or the second TRP without reporting of candidate reference signal IDs. Further, and as shown in FIG. 4, the format 405 and the format 410 may be associated with two octets of the control signal 400 and the format 415 may be associated with one octet of the control signal 400.

As such, different codepoints for the status indicator may map to different combinations of BFD and candidate reference signal reporting and some codepoints may be associated with different formats. For example, the UE 115 and the network entity receiving the control signal 400 may map different codepoints to different combinations and to different formats in accordance with the example mapping shown in Table 2, where the first TRP may be denoted as TRP1 and the second TRP may be denoted as TRP2.

TABLE 2

| Status Indicator (A1, AC1, A2, AC2) | TRP2 BFR with Candidate RS2 | TRP2 Not BFR | TRP2 BFR without Candidate RS2 |
|---|---|---|---|
| TRP1 BFR with Candidate RS1 | (1, 1, 1, 1) - RS1/RS2 ID, Format 405 | (1, 1, 0, 0) - RS1 ID, Format 410 | (1, 1, 1, 0) - RS1 ID, Format 410 |
| TRP1 Not BFR | (0, 0, 1, 1) - RS2 ID, Format 410 | 0 or N/A | (0, 0, 1, 0) - 0RS ID, Format 415 |
| TRP1 BFR without Candidate RS1 | (1, 0, 1, 1) - RS2 ID, Format 410 | (1, 0, 0, 0) - 0RS ID, Format 415 | (1, 0, 1, 0) - 0RS ID, Format 415 |

As shown in Table 2, different codepoints of the (A1, AC1, A2, AC2) bits of the status indicator may map to different combinations of BFD or BFR for each of the first TRP and the second TRP and whether the control signal 400 also includes candidate reference signal reporting for the first TRP and the second TRP. For example, with a status indicator (A1, AC1, A2, AC2) of (1,1,1,1) in the status indicator field 420-*a*, the UE 115 may indicate that beam failure is detected (and that BFR is requested) for both of the first TRP and the second TRP, that the control signal 400 includes a first candidate reference signal (RS1) for the first TRP and a second candidate reference signal (RS2) for the second TRP, and that the control signal 400 is associated with the format 405. In such examples, a first octet including the BFR information may include the status indicator in the status indicator field 420-*a* and a first portion of the candidate RS1 ID 445-*a* and a second octet including the BFR information may include a second portion of the candidate RS1 ID 445-*b* and the candidate RS2 ID 450.

In a further example, with a status indicator (A1, AC1, A2, AC2) of (1,1,1,0) in the status indicator field 420-*b*, the UE 115 may indicate that beam failure is detected (and that BFR is requested) for both of the first TRP and the second TRP, that the control signal 400 includes a first candidate reference signal (RS1) for the first TRP, that the control signal 400 does not include a second candidate reference signal (RS2) for the second TRP, and that the control signal 400 is associated with the format 410. In such examples, a first octet including the BFR information may include the status indicator in the status indicator field 420-*b* and a first portion of a candidate RSi ID 455-*a* (such as the RS1 ID) and a second octet including the BFR information may include a second portion of the candidate RSi ID 455-*b* (such as the RS1 ID) and a number of reserved bits 460. In a further example, with a status indicator (A1, AC1, A2, AC2) of (1,0,1,0) in the status indicator field 420-*c*, the UE 115 may indicate that beam failure is detected (and that BFR is requested) for both of the first TRP and the second TRP, that there is no reporting of candidate reference signals for either of the first TRP or the second TRP in the control signal 400, and that the control signal 400 is associated with the format 415. In such examples, a first (and only) octet including BFR information may include the status indicator in the status indicator field 420-*c* and a number of reserved bits 465 (such as four reserved bits).

Further, although illustrated and described in the context of the four bits of the status indicator including the bits (A1, AC1, A2, AC2) in that order, the bits of such a four-bit status indicator (where each bit indicates different BFR information associated with the TRPs or reporting information carried by the control signal 400) may appear in any order. For example, the UE 115 may alternatively include the status indicator in the control signal 400 as (A1, A2, AC1, AC2) or with any other ordering of the four bits.

In some implementations, the example mapping shown by Table 2 may be pre-configured, pre-loaded, or equipped at the UE 115. Additionally, or alternatively, the UE 115 receive an indication of the example mapping. In some implementations, the UE 115 may receive the indication of the example mapping from a network entity, including one or more components of a BS 105, the first TRP, or the second TRP.

Figure 5:
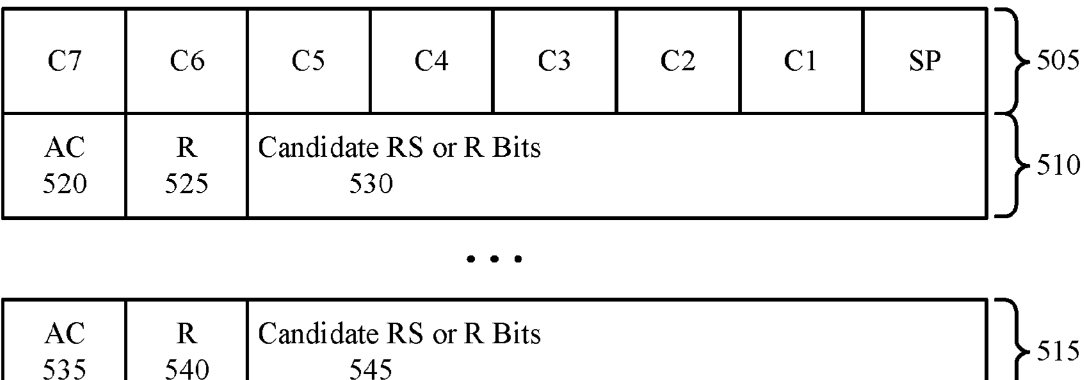

FIG. 5 illustrates an example control signal 500 that supports per-TRP beam failure reporting. The control signal 500 may implement or be implemented to realize one or more aspects of the wireless communications system 100 or the signaling diagram 200. For example, a UE 115 may generate and transmit, to a network entity, the control signal 500 as a result of or otherwise associated with a BFD. Such a UE 115 may be an example of a UE 115 as illustrated by or described with reference to FIGS. 1-4. Such a network entity may be an example of one or more components of a BS 105 or a TRP with which the UE 115 communicates as illustrated by or described with reference to FIGS. 1-4. In some implementations, the control signal 500 may not include a status indicator and the UE 115 may select to use the control signal 500 in deployment scenarios other than a multi-TRP deployment scenario.

The control signal 500 may be an example of a BFR MAC-CE and may include a $C_i$ field in a first octet 505 indicating a BFD and a presence of an octet, such as an octet 510 or an octet 515, including an AC field for a cell, such as an SCell, with ServCellIndex i (such as the cell $C_i$). As shown in FIG. 5, the control signal 500 may include eight $C_i$ fields in the first octet 505, the octet 510 may include an AC field 520, a reserved bit 525, and a candidate reference signal or a number of reserved bits 530, and the octet 515 may include an AC field 535, a reserved bit 540, and a candidate reference signal or a number of reserved bits 545.

The AC field included for each octet indicated by a $C_i$=1 value may indicate a presence of a candidate reference signal ID field in that octet. For example, if at least one of a set of SSBs with an RSRP, such as a synchronization signal RSRP (SS-RSRP), is above rsrp-ThresholdBFR amongst SSBs in candidateBeamRSSCellList or if at least one of a set of CSI-RSs with an RSRP, such as a CSI-RSRP, is above rsrp-ThresholdBFR amongst CSI-RSs in candidateBeamRSSCellList is available, the UE 115 may set the AC field to 1. Otherwise, the UE 115 may set the AC field to 0. If the UE 115 sets the AC field to 1, the UE 115 may include a candidate reference signal ID field in the control signal 500. If the UE 115 sets the AC field to 0, the UE 115 may include a number of reserved bits instead of the candidate reference signal ID field.

The UE 115 may set a candidate reference signal ID field to an index of an SSB with an SS-RSRP above rsrp-ThresholdBFR amongst the SSBs in candidate BeamRSSCellList or to the index of a CSI-RS with CSI-RSRP above rsrp-ThresholdBFR amongst the CSI-RSs in candidateBeamRSSCellList. In some aspects, the index of the SSB or the CSI-RS may be the index of an entry in candidate BeamRSSCellList corresponding to the SSB or the CSI-RS. An index of 0 may correspond to a first entry in the candidateBeamRSSCellList, an index of 1 may correspond to the second entry in the list, and so on. In some aspects, the length of a candidate reference signal ID field is 6 bits.

Figure 6:
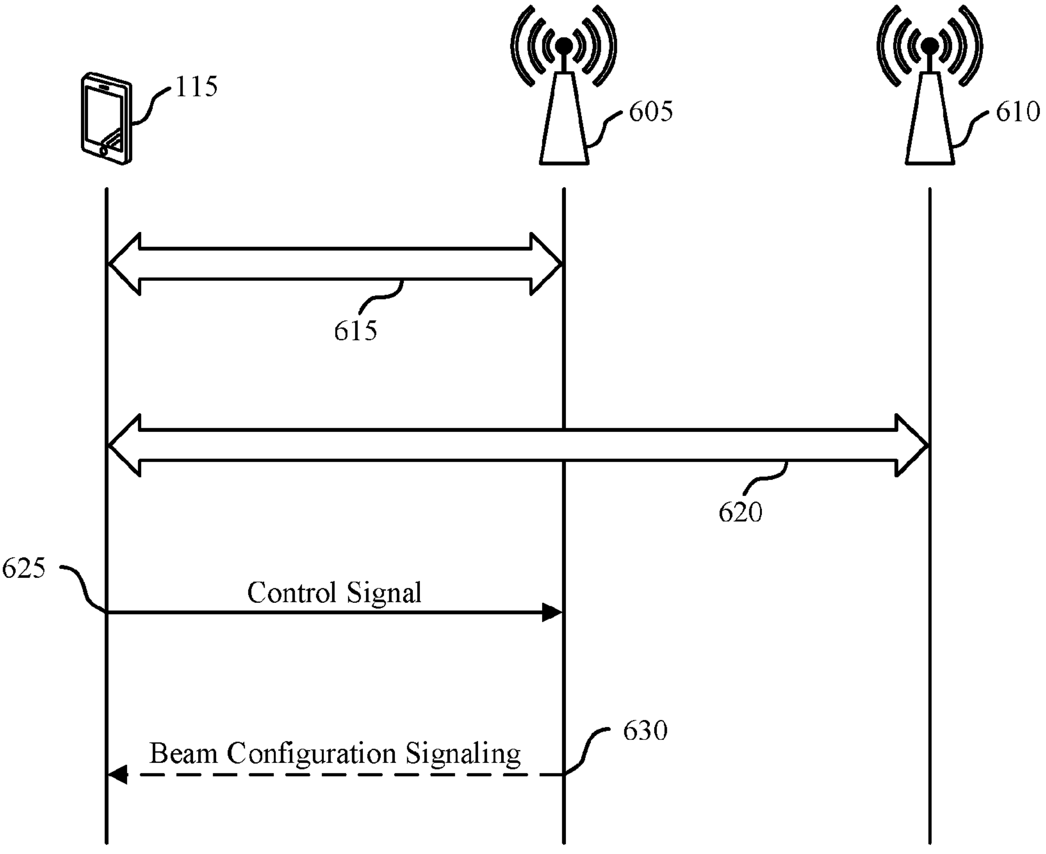
FIG. 6 illustrates an example process flow that supports per-TRP beam failure reporting.
Figure 6:

FIG. 6 illustrates an example process flow 600 that supports per-TRP beam failure reporting. The process flow 600 may implement or be implemented to realize one or more aspects of the wireless communications system 100, the signaling diagram 200, the control signal 300, the control signal 400, or the control signal 500. For example, the process flow 600 illustrates communication between a UE 115, a TRP 605, and a TRP 610. The UE 115 of FIG. 6 may be an example of a UE 115 as illustrated by or described with reference to FIGS. 1-5. The TRP 605 and the TRP 610 of FIG. 6 may be examples of TRPs illustrated by or described with reference to FIGS. 1-5. In some implementations, the UE 115 may transmit a control signal to a network entity, which may be one or more the TRP 605, the TRP 610, or one or more components of a BS 105. Such one or more components of the BS 105 may be examples of one or more components of the BS 105 as illustrated by or described with reference to FIGS. 1-5.

In the following description of the process flow 600, the operations may be performed (such as reported or provided) in a different order than the order shown, or the operations performed by the example devices may be performed in different orders or at different times. Some operations also may be omitted from the process flow 600, or other operations may be added to the process flow 600. Further, although some operations or signaling may be shown to occur at different times for discussion purposes, these operations may actually occur at the same time or otherwise concurrently.

At 615, the UE 115 may communicate with the TRP 605 (such as a first TRP) in accordance with a first configuration for directional communications. For example, the UE 115 may transmit to, or receive from, the TRP 605 using one or more directional communication beams that focus transmissions or reception toward the TRP 605. In some implementations, the UE 115 may receive one or more reference signals, such as BFD-RSs or NBI-RSs, or both, from the TRP 605 and may measure the reference signals to monitor a beam failure status of the TRP 605 and identify, select, obtain, or determine new beam information.

At 620, the UE 115 may communicate with the TRP 610 (such as a second TRP) in accordance with a second configuration for directional communications. For example, the UE 115 may transmit to, or receive from, the TRP 610 using one or more directional communication beams that focus transmissions or reception toward the TRP 610. In some implementations, the UE 115 may receive one or more reference signals, such as BFD-RSs or NBI-RSs, or both, from the TRP 610 and may measure the reference signals to monitor a beam failure status of the TRP 610 and identify, select, obtain, or determine new beam information.

At 625, the UE 115 may transmit, to a network entity, a control signal indicating a TRP beam failure status for the first configuration for directional communications with the first TRP and the second configuration for directional communications with the second TRP. For example, the UE 115 may transmit an indication of a per-TRP beam failure status for each of the first TRP and the second TRP (such as a first beam failure status for the first TRP and a second beam failure status for the second TRP). In some implementations, the UE 115 may transmit, via the control signal, an indication of a cell associated with the first TRP and the second TRP on which a beam failure is detected. In some implementations, the UE 115 may transmit, via the control signal, an indication of a per-component carrier beam failure, where the TRP beam failure status is associated with a first component carrier that is enabled, configured, or activated for TRP beam failure reporting (such as for per-TRP beam failure reporting). In some implementations, the UE 115 may transmit, via the control signal, a status indicator indicating the TRP beam failure status and indicating whether a candidate reference signal is reported via the control signal for identified TRPs of the TRP 605 and the TRP 610 for which beam failure is detected. Additional details relating to such a status indicator are illustrated by and described with reference to FIGS. 3 and 4. In some aspects, the control signal may be an example of a BFR MAC-CE associated with a format supporting BFR reporting in multi-TRP deployment scenarios.

At 630, the TRP 605 (or another network entity) may transmit, to the UE 115, beam configuration signaling associated with the BFR information provided by the UE 115 via the control signal. In some aspects, the beam configuration signaling may indicate one or more new directional beams that the identified TRPs for which beam failure is detected may use for communication with the UE as a result of the detected beam failure. Additionally, or alternatively, the beam configuration signaling may indicate or be part of a beam sweeping procedure or any other procedure associated with re-establishing a failed link between the UE 115 and one or both of the TRP 605 and the TRP 610. In some other aspects, the beam configuration signaling may be response signaling to the BFR reporting. The response signaling may be a DCI scheduling a physical uplink shared channel (PUSCH) transmission of the same HARQ ID as the PUSCH carrying the BFR reporting but with a toggled new assignment indicator. After some time offset (such as for example, 28 symbols) from receiving the response signaling to the BFR reporting, the UE 115 may reset the beam according to the candidate reference signals or NBI-RSs in the BFR reporting to transmit or receive a set of channels or references signals for beam recovery, where the set of channels or reference signals may include any of a physical downlink control channel (PDCCH), a physical downlink shared channel (PDSCH), a physical uplink control channel (PUCCH), or a PUSCH based on a rule, such as a predetermined rule.

The set of channels or reference signals may include two subsets of channels or reference signals where each subset is associated with one of two TRPs. For the UE 115 configured with single DCI-based multiple TRP operation where the PDCCHs are received in CORESETs and a CORESET may be configured with a single beam or TCI, and the reference signal in two BFD-RS sets or two NBI-RS sets may not be explicitly associated with any TRP, the UE 115 may select to reset the beam to the set of channels or reference signals based on a rule, such as a predetermined rule. For example, if two NBI-RSs are reported in the BFR reporting for a cell, the UE 115 may select one beam associated with one of two NBI-RSs (such as the first one) to reset the beam for the set of the channels or reference signals after receiving a response signaling for the BFR reporting. For the UE 115 with each reference signal in two BFD-RS sets or two NBI-RS sets explicitly associated with one of multiple TRPs, the UE 115 may reset the beam to the subset of the set of channels or reference signals corresponding to a TRP after receiving a response signaling for the BFR reporting. In some aspects, the UE 115 may reset the beam in accordance with each NBI-RS of the two NBI-RS sets and the TRP associated with that NBI-RS. For example, as part of resetting the beam in accordance with each NBI-RS, the UE 115 may reset of the beam to the subset of the set of channels or reference signals corresponding to the TRP associated with that NBI-RS. The association between a reference signal in two BFD-RS sets or two NBI-RS sets or a subset of channels or reference signals and a TRP may be preconfigured or pre-determined, such as by RRC signaling. The association between a subset of channels or reference signals and a TRP may be pre-determined, such as by RRC signaling.

Figure 7:
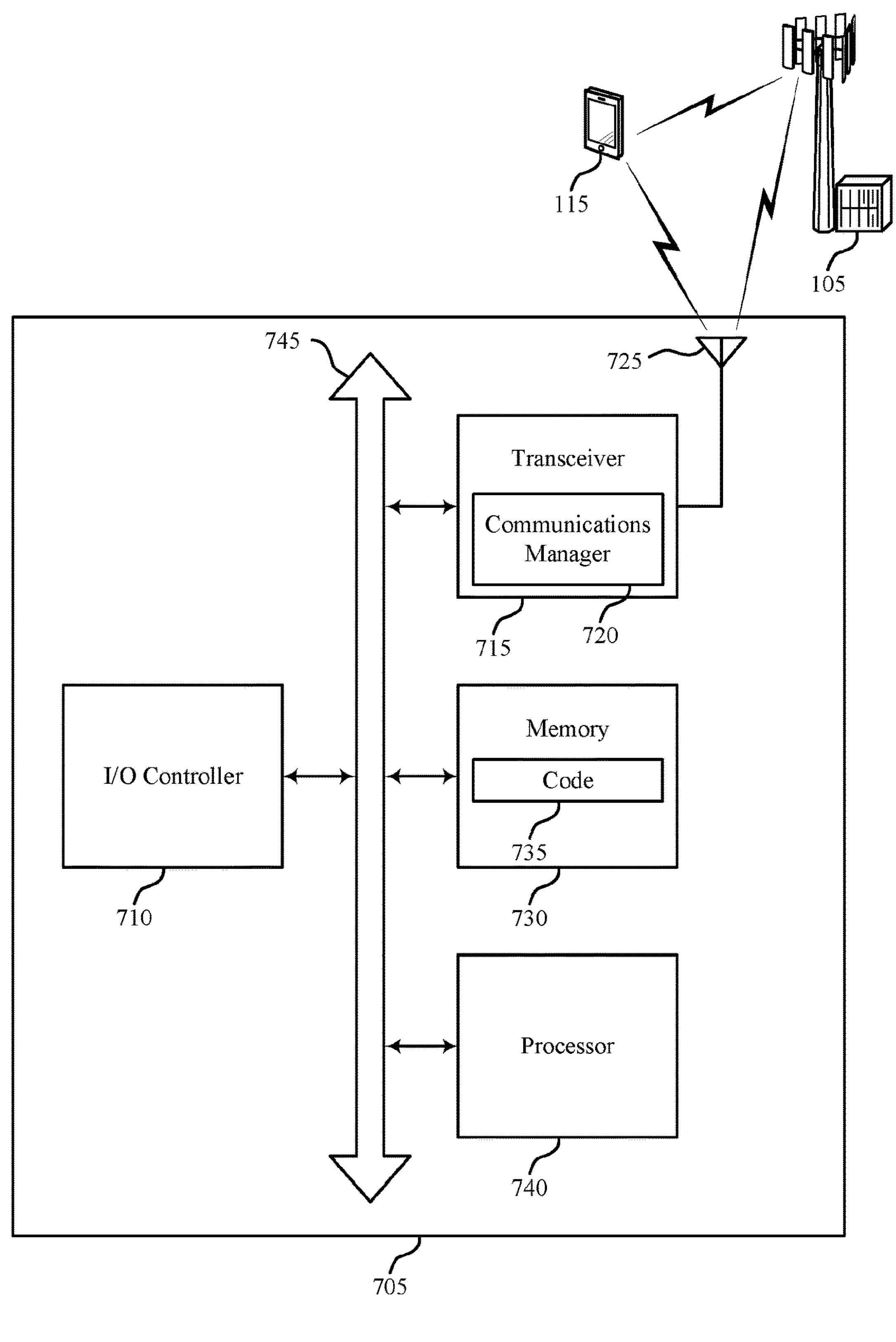
FIGS. 7 and 8 show block diagrams of example devices that support per-TRP beam failure reporting.

FIG. 7 shows a block diagram 700 of an example device 705 that supports per-TRP beam failure reporting. The device 705 may communicate wirelessly with one or more BSs 105, UEs 115, or any combination thereof. The device 705 may include components for bi-directional voice and data communications including components for transmitting and receiving communications, such as a communications manager 720, an input/output (I/O) controller 710, a transceiver 715, an antenna 725, a memory 730, code 735, and a processor 740. These components may be in electronic communication or otherwise coupled (such as operatively, communicatively, functionally, electronically, electrically) via one or more buses (such as a bus 745).

The I/O controller 710 may manage input and output signals for the device 705. The I/O controller 710 also may manage peripherals not integrated into the device 705. In some implementations, the I/O controller 710 may represent a physical connection or port to an external peripheral. In some implementations, the I/O controller 710 may utilize an operating system such as iOS®, ANDROID®, MS-DOS®, MS-WINDOWS®, OS/2®, UNIX®, LINUX®, or another known operating system. Additionally, or alternatively, the I/O controller 710 may represent or interact with a modem, a keyboard, a mouse, a touchscreen, or a similar device. In some implementations, the I/O controller 710 may be implemented as part of a processor or processing system, such as the processor 740. In some implementations, a user may interact with the device 705 via the I/O controller 710 or via hardware components controlled by the I/O controller 710.

In some implementations, the device 705 may include a single antenna 725. However, in some other implementations, the device 705 may have more than one antenna 725, which may be capable of concurrently transmitting or receiving multiple wireless transmissions. The transceiver 715 may communicate bi-directionally, via the one or more antennas 725, wired, or wireless links as described herein. For example, the transceiver 715 may represent a wireless transceiver and may communicate bi-directionally with another wireless transceiver. The transceiver 715 also may include a modem to modulate the packets, to provide the modulated packets to one or more antennas 725 for transmission, and to demodulate packets received from the one or more antennas 725.

In some implementations, the transceiver 715 may include one or more interfaces, such as one or more interfaces coupled with the one or more antennas 725 that are configured to support various receiving or obtaining operations, or one or more interfaces coupled with the one or more antennas 725 that are configured to support various transmitting or outputting operations, or a combination thereof. In some implementations, the transceiver 715 may include or be configured for coupling with one or more processors or memory components that are operable to perform or support operations based on or associated with received or obtained information or signals, or to generate information or other signals for transmission or other outputting, or any combination thereof. In some implementations, the transceiver 715, or the transceiver 715 and the one or more antennas 725, or the transceiver 715 and the one or more antennas 725 and one or more processors or memory components (for example, the processor 740, or the memory 730, or both), may be included in a chip or chip assembly that is installed in the device 705.

The memory 730 may include random access memory (RAM) and read-only memory (ROM). The memory 730 may store computer-readable, computer-executable code 735 including instructions that, when executed by the processor 740, cause the device 705 to perform various functions described herein. The code 735 may be stored in a non-transitory computer-readable medium such as system memory or another type of memory. In some implementations, the code 735 may not be directly executable by the processor 740 but may cause a computer (for example, when compiled and executed) to perform functions described herein. In some implementations, the memory 730 may contain, among other things, a basic I/O system (BIOS) which may control basic hardware or software operation such as the interaction with peripheral components or devices.

The processor 740 may be any one or more suitable processors capable of executing scripts or instructions of one or more software programs stored in the device 705 (such as within the memory 730). In some implementations, the processor 740 may be a component of a processing system. A processing system may generally refer to a system or series of machines or components that receives inputs and processes the inputs to produce a set of outputs (which may be passed to other systems or components of, for example, the device 705). For example, a processing system of the device 705 may refer to a system including the various other components or subcomponents of the device 705, such as the processor 740, or the transceiver 715, or the communications manager 720, or other components or combinations of components of the device 705.

The processing system of the device 705 may interface with other components of the device 705, and may process information received from other components (such as inputs or signals) or output information to other components. For example, a chip or modem of the device 705 may include a processing system, a first interface to output information, and a second interface to obtain information. In some implementations, the first interface may refer to an interface between the processing system of the chip or modem and a transmitter, such that the device 705 may transmit information output from the chip or modem. In some implementations, the second interface may refer to an interface between the processing system of the chip or modem and a receiver, such that the device 705 may obtain information or signal inputs, and the information may be passed to the processing system. A person having ordinary skill in the art will readily recognize that the first interface also may obtain information or signal inputs, and the second interface also may output information or signal outputs.

The communications manager 720 may support wireless communication at a UE in accordance with examples as disclosed herein. For example, the communications manager 720 may be configured as or otherwise support a means for communicating with a first TRP in accordance with a first configuration for directional communications. The communications manager 720 may be configured as or otherwise support a means for communicating with a second TRP in accordance with a second configuration for directional communications. The communications manager 720 may be configured as or otherwise support a means for transmitting a control signal indicating a TRP beam failure status for the first configuration for directional communications with the first TRP and the second configuration for directional communications with the second TRP.

In some implementations, to support transmitting the control signal indicating the TRP beam failure status, the communications manager 720 may be configured as or otherwise support a means for transmitting, via the control signal, an indication of a cell associated with the first TRP and the second TRP on which a beam failure is detected.

In some implementations, to support transmitting the control signal indicating the TRP beam failure status, the communications manager 720 may be configured as or otherwise support a means for transmitting, via the control signal, an indication of per-component carrier beam failure, where the TRP beam failure status is associated with a first component carrier that is enabled for TRP beam failure reporting.

In some implementations, to support transmitting the control signal indicating the TRP beam failure status, the communications manager 720 may be configured as or otherwise support a means for transmitting, via the control signal, a status indicator indicating the TRP beam failure status and indicating whether a candidate reference signal is reported via the control signal for identified TRPs of the first TRP and the second TRP for which beam failure is detected.

In some implementations, to support transmitting the control signal indicating the TRP beam failure status, the communications manager 720 may be configured as or otherwise support a means for transmitting the status indicator as a codepoint of a quantity of bits, where different codepoints indicate different TRP beam failure statuses and whether the candidate reference signal is reported via the control signal for the identified TRPs for which beam failure is detected.

In some implementations, the quantity of bits includes three bits, each codepoint associated with the three bits mapping to a specific combination of a BFD or a lack of BFD and candidate reference signal reporting or a lack of candidate reference signal reporting for first TRP and the second TRP.

In some implementations, the quantity of bits includes four bits, a first bit indicating a BFD or a lack of BFD for the first TRP, a second bit indicating candidate reference signal reporting or a lack of candidate reference signal reporting for the first TRP, a third bit indicating a BFD or a lack of BFD for the second TRP, and a fourth bit indicating candidate reference signal reporting or a lack of candidate reference signal reporting for the second TRP.

In some implementations, to support transmitting the control signal indicating the TRP beam failure status, the communications manager 720 may be configured as or otherwise support a means for transmitting the status indicator as a codepoint, where different codepoints indicate different formats of the control signal.

In some implementations, a first format is associated with a BFD for both of the first TRP and the second TRP and reporting of a candidate reference signal ID for the first TRP and the second TRP. In some implementations, a second format is associated with a BFD for at least one of the first TRP and the second TRP and reporting of a candidate reference signal ID for the one of the first TRP and the second TRP. In some implementations, a third format is associated with a BFD for at least one of the first TRP or the second TRP without reporting of candidate reference signal ID.

In some implementations, the first format and the second format are associated with two octets of the control signal and the third format is associated with one octet of the control signal. In some implementations, reported candidate reference signals are indicated by one or more of a TCI state, a reference signal ID, or a joint ID linking two or more reference signals. In some implementations, the control signal includes a BFR MAC-CE.

In some implementations, the communications manager 720 may be configured to perform various operations (for example, receiving, monitoring, transmitting) using or otherwise in cooperation with the transceiver 715, the one or more antennas 725, or any combination thereof. Although the communications manager 720 is illustrated as a separate component, in some implementations, one or more functions described with reference to the communications manager 720 may be supported by or performed by the processor 740, the memory 730, the code 735, or any combination thereof. For example, the code 735 may include instructions executable by the processor 740 to cause the device 705 to perform various aspects of per-TRP beam failure reporting as described herein, or the processor 740 and the memory 730 may be otherwise configured to perform or support such operations.

Figure 8:
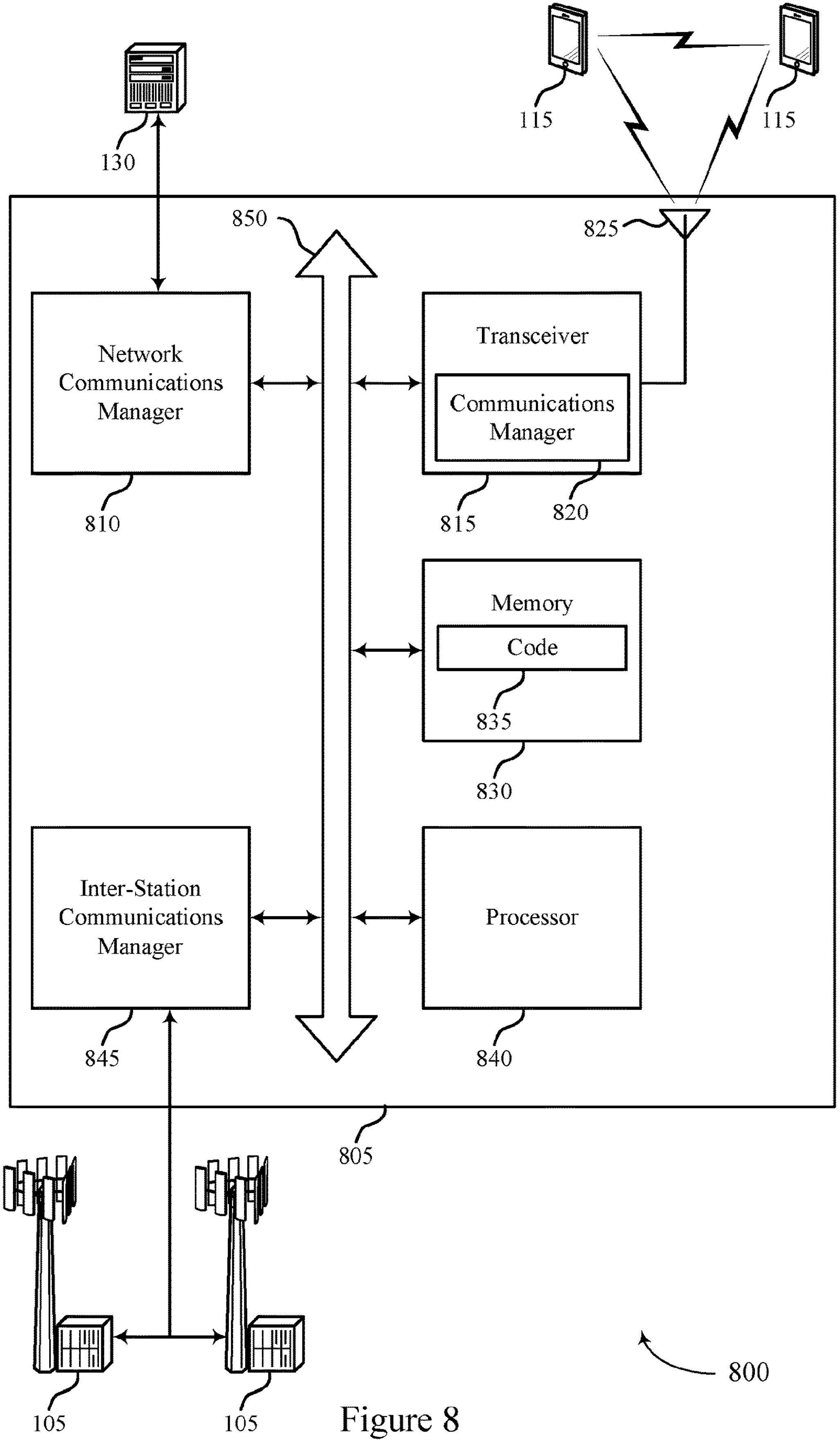

FIG. 8 shows a block diagram 800 of an example device 805 that supports per-TRP beam failure reporting. The device 805 may communicate wirelessly with one or more BSs 105, UEs 115, or any combination thereof. The device 805 may include components for bi-directional voice and data communications including components for transmitting and receiving communications, such as a communications manager 820, a network communications manager 810, a transceiver 815, an antenna 825, a memory 830, code 835, a processor 840, and an inter-station communications manager 845. These components may be in electronic communication or otherwise coupled (such as operatively, communicatively, functionally, electronically, electrically) via one or more buses (such as a bus 850).

The network communications manager 810 may manage communications with a core network 130 (for example, via one or more wired backhaul links). For example, the network communications manager 810 may manage the transfer of data communications for client devices, such as one or more UEs 115.

In some implementations, the device 805 may include a single antenna 825. However, in some other implementations, the device 805 may have more than one antenna 825, which may be capable of concurrently transmitting or receiving multiple wireless transmissions. The transceiver 815 may communicate bi-directionally, via the one or more antennas 825, wired, or wireless links as described herein. For example, the transceiver 815 may represent a wireless transceiver and may communicate bi-directionally with another wireless transceiver. The transceiver 815 also may include a modem to modulate the packets, to provide the modulated packets to one or more antennas 825 for transmission, and to demodulate packets received from the one or more antennas 825.

In some implementations, the transceiver 815 may include one or more interfaces, such as one or more interfaces coupled with the one or more antennas 825 that are configured to support various receiving or obtaining operations, or one or more interfaces coupled with the one or more antennas 825 that are configured to support various transmitting or outputting operations, or a combination thereof. In some implementations, the transceiver 815 may include or be configured for coupling with one or more processors or memory components that are operable to perform or support operations based on or associated with received or obtained information or signals, or to generate information or other signals for transmission or other outputting, or any combination thereof. In some implementations, the transceiver 815, or the transceiver 815 and the one or more antennas 825, or the transceiver 815 and the one or more antennas 825 and one or more processors or memory components (for example, the processor 840, or the memory 830, or both), may be included in a chip or chip assembly that is installed in the device 805.

The memory 830 may include RAM and ROM. The memory 830 may store computer-readable, computer-executable code 835 including instructions that, when executed by the processor 840, cause the device 805 to perform various functions described herein. The code 835 may be stored in a non-transitory computer-readable medium such as system memory or another type of memory. In some implementations, the code 835 may not be directly executable by the processor 840 but may cause a computer (for example, when compiled and executed) to perform functions described herein. In some implementations, the memory 830 may contain, among other things, a BIOS which may control basic hardware or software operation such as the interaction with peripheral components or devices.

The processor 840 may be any one or more suitable processors capable of executing scripts or instructions of one or more software programs stored in the device 805 (such as within the memory 830). In some implementations, the processor 840 may be a component of a processing system. A processing system may generally refer to a system or series of machines or components that receives inputs and processes the inputs to produce a set of outputs (which may be passed to other systems or components of, for example, the device 805). For example, a processing system of the device 805 may refer to a system including the various other components or subcomponents of the device 805, such as the processor 840, or the transceiver 815, or the communications manager 820, or other components or combinations of components of the device 805.

The processing system of the device 805 may interface with other components of the device 805, and may process information received from other components (such as inputs or signals) or output information to other components. For example, a chip or modem of the device 805 may include a processing system, a first interface to output information, and a second interface to obtain information. In some implementations, the first interface may refer to an interface between the processing system of the chip or modem and a transmitter, such that the device 805 may transmit information output from the chip or modem. In some implementations, the second interface may refer to an interface between the processing system of the chip or modem and a receiver, such that the device 805 may obtain information or signal inputs, and the information may be passed to the processing system. A person having ordinary skill in the art will readily recognize that the first interface also may obtain information or signal inputs, and the second interface also may output information or signal outputs.

The inter-station communications manager 845 may manage communications with other BSs 105, and may include a controller or scheduler for controlling communications with UEs 115 in cooperation with other BSs 105. For example, the inter-station communications manager 845 may coordinate scheduling for transmissions to UEs 115 for various interference mitigation techniques such as beamforming or joint transmission. In some implementations, the inter-station communications manager 845 may provide an X2 interface within an LTE/LTE-A wireless communications network technology to provide communication between BSs 105.

The communications manager 820 may support wireless communication at a network entity in accordance with examples as disclosed herein. For example, the communications manager 820 may be configured as or otherwise support a means for communicating with a UE via a first TRP in accordance with a first configuration for directional communications. The communications manager 820 may be configured as or otherwise support a means for communicating with the UE via a second TRP in accordance with a second configuration for directional communications. The communications manager 820 may be configured as or otherwise support a means for receiving, from the UE, a control signal indicating a TRP beam failure status for the first configuration for directional communications with the first TRP and the second configuration for directional communications with the second TRP.

In some implementations, to support receiving the control signal indicating the TRP beam failure status, the communications manager 820 may be configured as or otherwise support a means for receiving, via the control signal, an indication of a cell associated with the first TRP and the second TRP on which a beam failure is detected.

In some implementations, to support receiving the control signal indicating the TRP beam failure status, the communications manager 820 may be configured as or otherwise support a means for receiving, via the control signal, an indication of per-component carrier beam failure, where the TRP beam failure status is associated with a first component carrier that is enabled for TRP beam failure reporting.

In some implementations, to support receiving the control signal indicating the TRP beam failure status, the communications manager 820 may be configured as or otherwise support a means for receiving, via the control signal, a status indicator indicating the TRP beam failure status and indicating whether a candidate reference signal is reported via the control signal for identified TRPs of the first TRP and the second TRP for which beam failure is detected.

In some implementations, to support receiving the control signal indicating the TRP beam failure status, the communications manager 820 may be configured as or otherwise support a means for receiving the status indicator as a codepoint of a quantity of bits, where different codepoints indicate different TRP beam failure statuses and whether the candidate reference signal is reported via the control signal for the identified TRPs for which beam failure is detected.

In some implementations, the quantity of bits includes three bits, each codepoint associated with the three bits mapping to a specific combination of a BFD or a lack of BFD and candidate reference signal reporting or a lack of candidate reference signal reporting for the first TRP and the second TRP.

In some implementations, the quantity of bits includes four bits, a first bit indicating a BFD or a lack of BFD for the first TRP, a second bit indicating candidate reference signal reporting or a lack of candidate reference signal reporting for the first TRP, a third bit indicating a BFD or a lack of BFD for the second TRP, and a fourth bit indicating candidate reference signal reporting or a lack of candidate reference signal reporting for the second TRP.

In some implementations, to support receiving the control signal indicating the TRP beam failure status, the communications manager 820 may be configured as or otherwise support a means for receiving the status indicator as a codepoint, where different codepoints indicate different formats of the control signal.

In some implementations, a first format is associated with a BFD for both of the first TRP and the second TRP and reporting of a candidate reference signal ID for the first TRP and the second TRP. In some implementations, a second format is associated with a BFD for at least one of the first TRP and the second TRP and reporting of a candidate reference signal ID for the one of the first TRP and the second TRP. In some implementations, a third format is associated with a BFD for at least one of the first TRP or the second TRP without reporting of candidate reference signal IDs.

In some implementations, the first format and the second format are associated with two octets of the control signal and the third format is associated with one octet of the control signal. In some implementations, reported candidate reference signals are indicated by one or more of a TCI state, a reference signal ID, or a joint ID linking two or more reference signals. In some implementations, the control signal includes a BFR MAC-CE.

In some implementations, the communications manager 820 may be configured to perform various operations (for example, receiving, monitoring, transmitting) using or otherwise in cooperation with the transceiver 815, the one or more antennas 825, or any combination thereof. Although the communications manager 820 is illustrated as a separate component, in some implementations, one or more functions described with reference to the communications manager 820 may be supported by or performed by the processor 840, the memory 830, the code 835, or any combination thereof. For example, the code 835 may include instructions executable by the processor 840 to cause the device 805 to perform various aspects of per-TRP beam failure reporting as described herein, or the processor 840 and the memory 830 may be otherwise configured to perform or support such operations.

Figure 9:
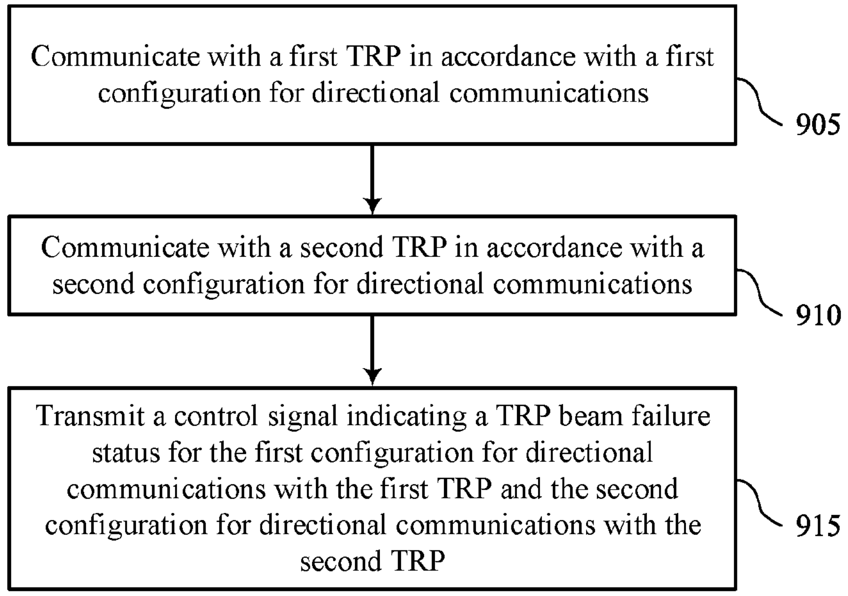
FIGS. 9 and 10 show flowcharts illustrating example methods that support per-TRP beam failure reporting.

FIG. 9 shows a flowchart illustrating an example method 900 that supports per-TRP beam failure reporting. The operations of the method 900 may be implemented by a UE or its components as described herein. For example, the operations of the method 900 may be performed by a UE 115 as described with reference to FIGS. 1-7. In some implementations, a UE may execute a set of instructions to control the functional elements of the UE to perform the described functions. Additionally, or alternatively, the UE may perform aspects of the described functions using special-purpose hardware.

At 905, the method may include communicating with a first TRP in accordance with a first configuration for directional communications. The operations of 905 may be performed in accordance with examples as disclosed herein.

In some implementations, aspects of the operations of 905 may be performed by a communications manager 720 as described with reference to FIG. 7.

At 910, the method may include communicating with a second TRP in accordance with a second configuration for directional communications. The operations of 910 may be performed in accordance with examples as disclosed herein. In some implementations, aspects of the operations of 910 may be performed by a communications manager 720 as described with reference to FIG. 7.

At 915, the method may include transmitting a control signal indicating a TRP beam failure status for the first configuration for directional communications with the first TRP and the second configuration for directional communications with the second TRP. The operations of 915 may be performed in accordance with examples as disclosed herein. In some implementations, aspects of the operations of 915 may be performed by a communications manager 720 as described with reference to FIG. 7.

Figure 10:
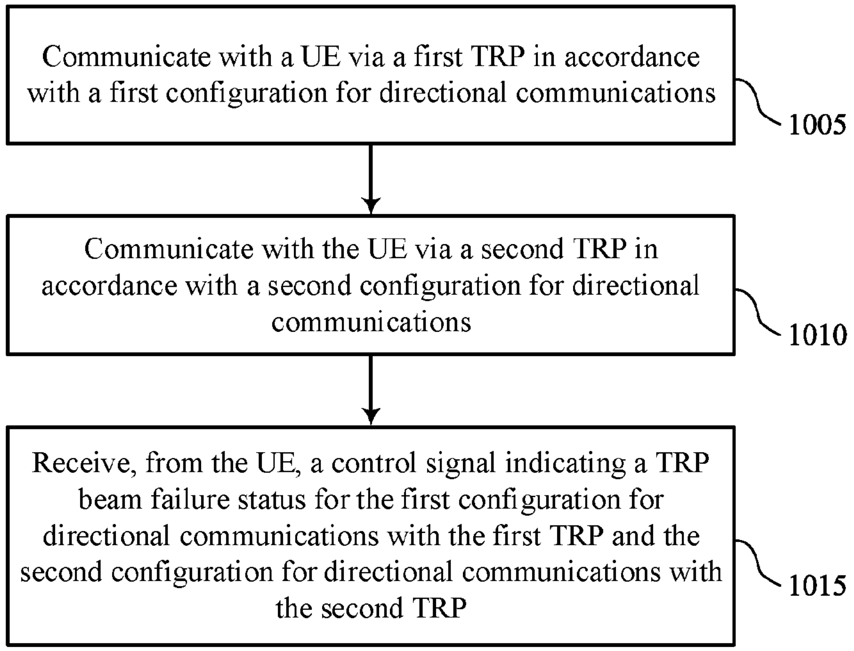

FIG. 10 shows a flowchart illustrating an example method 1000 that supports per-TRP beam failure reporting. The operations of the method 1000 may be implemented by a network entity, such as a BS or its components as described herein. For example, the operations of the method 1000 may be performed by a BS 105 as described with reference to FIGS. 1-6 and 8. In some implementations, a BS may execute a set of instructions to control the functional elements of the BS to perform the described functions. Additionally, or alternatively, the BS may perform aspects of the described functions using special-purpose hardware.

At 1005, the method may include communicating with a UE via a first TRP in accordance with a first configuration for directional communications. The operations of 1005 may be performed in accordance with examples as disclosed herein. In some implementations, aspects of the operations of 1005 may be performed by a communications manager 820 as described with reference to FIG. 8.

At 1010, the method may include communicating with the UE via a second TRP in accordance with a second configuration for directional communications. The operations of 1010 may be performed in accordance with examples as disclosed herein. In some implementations, aspects of the operations of 1010 may be performed by a communications manager 820 as described with reference to FIG. 8.

At 1015, the method may include receiving, from the UE, a control signal indicating a TRP beam failure status for the first configuration for directional communications with the first TRP and the second configuration for directional communications with the second TRP. The operations of 1015 may be performed in accordance with examples as disclosed herein. In some implementations, aspects of the operations of 1015 may be performed by a communications manager 820 as described with reference to FIG. 8.

The following provides an overview of some aspects of the present disclosure:

Aspect 1: An apparatus for wireless communication at a UE, including: a first interface configured to: communicate with a first TRP in accordance with a first configuration for directional communications; communicate with a second TRP in accordance with a second configuration for directional communications; and the first interface or a second interface configured to: output a control signal indicating a TRP beam failure status for the first configuration for directional communications with the first TRP and the second configuration for directional communications with the second TRP.

Aspect 2: The apparatus of aspect 1, where outputting the control signal indicating the TRP beam failure status further includes: outputting, via the control signal, an indication of a cell associated with the first TRP and the second TRP on which a beam failure is detected.

Aspect 3: The apparatus of any of aspects 1 or 2, where outputting the control signal indicating the TRP beam failure status further includes: outputting, via the control signal, an indication of per-component carrier beam failure, where the TRP beam failure status is associated with a first component carrier that is enabled for TRP beam failure reporting.

Aspect 4: The apparatus of any of aspects 1-3, where outputting the control signal indicating the TRP beam failure status further includes: outputting, via the control signal, a status indicator indicating the TRP beam failure status and indicating whether a candidate reference signal is reported via the control signal for identified TRPs of the first TRP and the second TRP for which beam failure is detected.

Aspect 5: The apparatus of aspect 4, where outputting the control signal indicating the TRP beam failure status further includes: outputting the status indicator as a codepoint of a quantity of bits, where different codepoints indicate different TRP beam failure statuses and whether the candidate reference signal is reported via the control signal for the identified TRPs for which beam failure is detected.

Aspect 6: The apparatus of aspect 5, where the quantity of bits includes three bits, each codepoint associated with the three bits mapping to a specific combination of a BFD or a lack of BFD and candidate reference signal reporting or a lack of candidate reference signal reporting for first TRP and the second TRP.

Aspect 7: The apparatus of aspect 5, where the quantity of bits includes four bits, a first bit indicating a BFD or a lack of BFD for the first TRP, a second bit indicating candidate reference signal reporting or a lack of candidate reference signal reporting for the first TRP, a third bit indicating a BFD or a lack of BFD for the second TRP, and a fourth bit indicating candidate reference signal reporting or a lack of candidate reference signal reporting for the second TRP.

Aspect 8: The apparatus of any of aspects 4-7, where outputting the control signal indicating the TRP beam failure status further includes: outputting the status indicator as a codepoint, where different codepoints indicate different formats of the control signal.

Aspect 9: The apparatus of aspect 8, where the status indicator indicates one of: a first format associated with a BFD for both of the first TRP and the second TRP and reporting of a candidate reference signal ID for the first TRP and the second TRP; a second format associated with a BFD for at least one of the first TRP and the second TRP and reporting of a candidate reference signal ID for the one of the first TRP and the second TRP; and a third format associated with a BFD for at least one of the first TRP or the second TRP without reporting of candidate reference signal IDs.

Aspect 10: The apparatus of aspect 9, where the first format and the second format are associated with two octets of the control signal and the third format is associated with one octet of the control signal.

Aspect 11: The apparatus of any of aspects 4-10, where reported candidate reference signals are indicated by one or more of a TCI state, a reference signal ID, or a joint ID linking two or more reference signals.

Aspect 12: The apparatus of any of aspects 1-11, where the control signal includes a BFR MAC-CE.

Aspect 13: An apparatus for wireless communication at a network entity, including: a first interface configured to:

communicate with a UE via a first TRP in accordance with a first configuration for directional communications; communicate with the UE via a second TRP in accordance with a second configuration for directional communications; and the first interface or a second interface configured to: obtain, from the UE, a control signal indicating a TRP beam failure status for the first configuration for directional communications with the first TRP and the second configuration for directional communications with the second TRP.

Aspect 14: The apparatus of aspect 13, where obtaining the control signal indicating the TRP beam failure status further includes: obtaining, via the control signal, an indication of a cell associated with the first TRP and the second TRP on which a beam failure is detected.

Aspect 15: The apparatus of any of aspects 13 or 14, where obtaining the control signal indicating the TRP beam failure status further includes: obtaining, via the control signal, an indication of per-component carrier beam failure, where the TRP beam failure status is associated with a first component carrier that is enabled for TRP beam failure reporting.

Aspect 16: The apparatus of any of aspects 13-15, where obtaining the control signal indicating the TRP beam failure status further includes: obtaining, via the control signal, a status indicator indicating the TRP beam failure status and indicating whether a candidate reference signal is reported via the control signal for identified TRPs of the first TRP and the second TRP for which beam failure is detected.

Aspect 17: The apparatus of aspect 16, where obtaining the control signal indicating the TRP beam failure status further includes: obtaining the status indicator as a codepoint of a quantity of bits, where different codepoints indicate different TRP beam failure statuses and whether the candidate reference signal is reported via the control signal for the identified TRPs for which beam failure is detected.

Aspect 18: The apparatus of aspect 17, where the quantity of bits includes three bits, each codepoint associated with the three bits mapping to a specific combination of a BFD or a lack of BFD and candidate reference signal reporting or a lack of candidate reference signal reporting for the first TRP and the second TRP.

Aspect 19: The apparatus of aspect 17, where the quantity of bits includes four bits, a first bit indicating a BFD or a lack of BFD for the first TRP, a second bit indicating candidate reference signal reporting or a lack of candidate reference signal reporting for the first TRP, a third bit indicating a BFD or a lack of BFD for the second TRP, and a fourth bit indicating candidate reference signal reporting or a lack of candidate reference signal reporting for the second TRP.

Aspect 20: The apparatus of any of aspects 16-19, where obtaining the control signal indicating the TRP beam failure status further includes: obtaining the status indicator as a codepoint, where different codepoints indicate different formats of the control signal.

Aspect 21: The apparatus of aspect 20, where the status indicator indicates one of: a first format associated with a BFD for both of the first TRP and the second TRP and reporting of a candidate reference signal ID for the first TRP and the second TRP; a second format associated with a BFD for at least one of the first TRP and the second TRP and reporting of a candidate reference signal ID for the one of the first TRP and the second TRP; and a third format associated with a BFD for at least one of the first TRP or the second TRP without reporting of candidate reference signal IDs.

Aspect 22: The apparatus of aspect 21, where the first format and the second format are associated with two octets of the control signal and the third format is associated with one octet of the control signal.

Aspect 23: The apparatus of any of aspects 16-22, where reported candidate reference signals are indicated by one or more of a TCI state, a reference signal ID, or a joint ID linking two or more reference signals.

Aspect 24: The apparatus of any of aspects 13-23, where the control signal includes a BFR MAC-CE.

Aspect 25: A method for wireless communication at a UE, including: communicating with a first TRP in accordance with a first configuration for directional communications; communicating with a second TRP in accordance with a second configuration for directional communications; and transmitting a control signal indicating a TRP beam failure status for the first configuration for directional communications with the first TRP and the second configuration for directional communications with the second TRP.

Aspect 26: The method of aspect 25, where transmitting the control signal indicating the TRP beam failure status further includes: transmitting, via the control signal, an indication of a cell associated with the first TRP and the second TRP on which a beam failure is detected.

Aspect 27: The method of any of aspects 25 or 26, where transmitting the control signal indicating the TRP beam failure status further includes: transmitting, via the control signal, an indication of per-component carrier beam failure, where the TRP beam failure status is associated with a first component carrier that is enabled for TRP beam failure reporting.

Aspect 28: The method of any of aspects 25-27, where transmitting the control signal indicating the TRP beam failure status further includes: transmitting, via the control signal, a status indicator indicating the TRP beam failure status and indicating whether a candidate reference signal is reported via the control signal for identified TRPs of the first TRP and the second TRP for which beam failure is detected.

Aspect 29: The method of aspect 28, where transmitting the control signal indicating the TRP beam failure status further includes: transmitting the status indicator as a codepoint of a quantity of bits, where different codepoints indicate different TRP beam failure statuses and whether the candidate reference signal is reported via the control signal for the identified TRPs for which beam failure is detected.

Aspect 30: The method of aspect 29, where the quantity of bits includes three bits, each codepoint associated with the three bits mapping to a specific combination of a BFD or a lack of BFD and candidate reference signal reporting or a lack of candidate reference signal reporting for first TRP and the second TRP.

Aspect 31: The method of aspect 29, where the quantity of bits includes four bits, a first bit indicating a BFD or a lack of BFD for the first TRP, a second bit indicating candidate reference signal reporting or a lack of candidate reference signal reporting for the first TRP, a third bit indicating a BFD or a lack of BFD for the second TRP, and a fourth bit indicating candidate reference signal reporting or a lack of candidate reference signal reporting for the second TRP.

Aspect 32: The method of any of aspects 28-31, where transmitting the control signal indicating the TRP beam failure status further includes: transmitting the status indicator as a codepoint, where different codepoints indicate different formats of the control signal.

Aspect 33: The method of aspect 32, where the status indicator indicates one of a first format associated with a BFD for both of the first TRP and the second TRP and reporting of a candidate reference signal ID for the first TRP and the second TRP; a second format associated with a BFD for at least one of the first TRP and the second TRP and reporting of a candidate reference signal ID for the one of the first TRP and the second TRP; and a third format associated with a BFD for at least one of the first TRP or the second TRP without reporting of candidate reference signal IDs.

Aspect 34: The method of aspect 33, where the first format and the second format are associated with two octets of the control signal and the third format is associated with one octet of the control signal.

Aspect 35: The method of any of aspects 28-34, where reported candidate reference signals are indicated by one or more of a TCI state, a reference signal ID, or a joint ID linking two or more reference signals.

Aspect 36: The method of any of aspects 25-35, where the control signal includes a BFR MAC-CE.

Aspect 37: A method for wireless communication at a network entity, including: communicating with a UE via a first TRP in accordance with a first configuration for directional communications; communicating with the UE via a second TRP in accordance with a second configuration for directional communications; and receiving, from the UE, a control signal indicating a TRP beam failure status for the first configuration for directional communications with the first TRP and the second configuration for directional communications with the second TRP.

Aspect 38: The method of aspect 37, where receiving the control signal indicating the TRP beam failure status further includes: receiving, via the control signal, an indication of a cell associated with the first TRP and the second TRP on which a beam failure is detected.

Aspect 39: The method of any of aspects 37 or 38, where receiving the control signal indicating the TRP beam failure status further includes: receiving, via the control signal, an indication of per-component carrier beam failure, where the TRP beam failure status is associated with a first component carrier that is enabled for TRP beam failure reporting.

Aspect 40: The method of any of aspects 37-39, where receiving the control signal indicating the TRP beam failure status further includes: receiving, via the control signal, a status indicator indicating the TRP beam failure status and indicating whether a candidate reference signal is reported via the control signal for identified TRPs of the first TRP and the second TRP for which beam failure is detected.

Aspect 41: The method of aspect 40, where receiving the control signal indicating the TRP beam failure status further includes: receiving the status indicator as a codepoint of a quantity of bits, where different codepoints indicate different TRP beam failure statuses and whether the candidate reference signal is reported via the control signal for the identified TRPs for which beam failure is detected.

Aspect 42: The method of aspect 41, where the quantity of bits includes three bits, each codepoint associated with the three bits mapping to a specific combination of a BFD or a lack of BFD and candidate reference signal reporting or a lack of candidate reference signal reporting for the first TRP and the second TRP.

Aspect 43: The method of aspect 41, where the quantity of bits includes four bits, a first bit indicating a BFD or a lack of BFD for the first TRP, a second bit indicating candidate reference signal reporting or a lack of candidate reference signal reporting for the first TRP, a third bit indicating a BFD or a lack of BFD for the second TRP, and a fourth bit indicating candidate reference signal reporting or a lack of candidate reference signal reporting for the second TRP.

Aspect 44: The method of any of aspects 40-43, where receiving the control signal indicating the TRP beam failure status further includes: receiving the status indicator as a codepoint, where different codepoints indicate different formats of the control signal.

Aspect 45: The method of aspect 44, where the status indicator indicates one of a first format associated with a BFD for both of the first TRP and the second TRP and reporting of a candidate reference signal ID for the first TRP and the second TRP; a second format associated with a BFD for at least one of the first TRP and the second TRP and reporting of a candidate reference signal ID for the one of the first TRP and the second TRP; and a third format associated with a BFD for at least one of the first TRP or the second TRP without reporting of candidate reference signal IDs.

Aspect 46: The method of aspect 45, where the first format and the second format are associated with two octets of the control signal and the third format is associated with one octet of the control signal.

Aspect 47: The method of any of aspects 40-46, where reported candidate reference signals are indicated by one or more of a TCI state, a reference signal ID, or a joint ID linking two or more reference signals.

Aspect 48: The method of any of aspects 37-47, where the control signal includes a BFR MAC-CE.

Aspect 49: An apparatus for wireless communication at a UE, including: a processor; memory coupled with the processor; and instructions stored in the memory and executable by the processor to cause the apparatus to: communicate with a first TRP in accordance with a first configuration for directional communications; communicate with a second TRP in accordance with a second configuration for directional communications; and transmit a control signal indicating a TRP beam failure status for the first configuration for directional communications with the first TRP and the second configuration for directional communications with the second TRP.

Aspect 50: The apparatus of aspect 49, where the instructions to transmit the control signal indicating the TRP beam failure status are further executable by the processor to cause the apparatus to: transmit, via the control signal, an indication of a cell associated with the first TRP and the second TRP on which a beam failure is detected.

Aspect 51: The apparatus of any of aspects 49 or 50, where the instructions to transmit the control signal indicating the TRP beam failure status are further executable by the processor to cause the apparatus to: transmit, via the control signal, an indication of per-component carrier beam failure, where the TRP beam failure status is associated with a first component carrier that is enabled for TRP beam failure reporting.

Aspect 52: The apparatus of any of aspects 49-51, where the instructions to transmit the control signal indicating the TRP beam failure status are further executable by the processor to cause the apparatus to: transmit, via the control signal, a status indicator indicating the TRP beam failure status and indicating whether a candidate reference signal is reported via the control signal for identified TRPs of the first TRP and the second TRP for which beam failure is detected.

Aspect 53: The apparatus of aspect 52, where the instructions to transmit the control signal indicating the TRP beam failure status are further executable by the processor to cause the apparatus to: transmit the status indicator as a codepoint of a quantity of bits, where different codepoints indicate different TRP beam failure statuses and whether the candidate reference signal is reported via the control signal for the identified TRPs for which beam failure is detected.

Aspect 54: The apparatus of aspect 53, where the quantity of bits includes three bits, each codepoint associated with the three bits mapping to a specific combination of a BFD or a lack of BFD and candidate reference signal reporting or a lack of candidate reference signal reporting for first TRP and the second TRP.

Aspect 55: The apparatus of aspect 53, where the quantity of bits includes four bits, a first bit indicating a BFD or a lack of BFD for the first TRP, a second bit indicating candidate reference signal reporting or a lack of candidate reference signal reporting for the first TRP, a third bit indicating a BFD or a lack of BFD for the second TRP, and a fourth bit indicating candidate reference signal reporting or a lack of candidate reference signal reporting for the second TRP.

Aspect 56: The apparatus of any of aspects 52-55, where the instructions to transmit the control signal indicating the TRP beam failure status are further executable by the processor to cause the apparatus to: transmit the status indicator as a codepoint, where different codepoints indicate different formats of the control signal.

Aspect 57: The apparatus of aspect 56, where a first format associated with a BFD for both of the first TRP and the second TRP and reporting of a candidate reference signal ID for the first TRP and the second TRP; a second format associated with a BFD for at least one of the first TRP and the second TRP and reporting of a candidate reference signal ID for the one of the first TRP and the second TRP; and a third format associated with a BFD for at least one of the first TRP or the second TRP without reporting of candidate reference signal IDs.

Aspect 58: The apparatus of aspect 57, where the first format and the second format are associated with two octets of the control signal and the third format is associated with one octet of the control signal.

Aspect 59: The apparatus of any of aspects 52-58, where reported candidate reference signals are indicated by one or more of a TCI state, a reference signal ID, or a joint ID linking two or more reference signals.

Aspect 60: The apparatus of any of aspects 49-59, where the control signal includes a BFR MAC-CE.

Aspect 61: An apparatus for wireless communication at a network entity, including: a processor; memory coupled with the processor; and instructions stored in the memory and executable by the processor to cause the apparatus to: communicate with a UE via a first TRP in accordance with a first configuration for directional communications; communicate with the UE via a second TRP in accordance with a second configuration for directional communications; and receive, from the UE, a control signal indicating a TRP beam failure status for the first configuration for directional communications with the first TRP and the second configuration for directional communications with the second TRP.

Aspect 62: The apparatus of aspect 61, where the instructions to receive the control signal indicating the TRP beam failure status are further executable by the processor to cause the apparatus to: receive, via the control signal, an indication of a cell associated with the first TRP and the second TRP on which a beam failure is detected.

Aspect 63: The apparatus of any of aspects 61 or 62, where the instructions to receive the control signal indicating the TRP beam failure status are further executable by the processor to cause the apparatus to: receive, via the control signal, an indication of per-component carrier beam failure, where the TRP beam failure status is associated with a first component carrier that is enabled for TRP beam failure reporting.

Aspect 64: The apparatus of any of aspects 61-63, where the instructions to receive the control signal indicating the TRP beam failure status are further executable by the processor to cause the apparatus to: receive, via the control signal, a status indicator indicating the TRP beam failure status and indicating whether a candidate reference signal is reported via the control signal for identified TRPs of the first TRP and the second TRP for which beam failure is detected.

Aspect 65: The apparatus of aspect 64, where the instructions to receive the control signal indicating the TRP beam failure status are further executable by the processor to cause the apparatus to: receive the status indicator as a codepoint of a quantity of bits, where different codepoints indicate different TRP beam failure statuses and whether the candidate reference signal is reported via the control signal for the identified TRPs for which beam failure is detected.

Aspect 66: The apparatus of aspect 65, where the quantity of bits includes three bits, each codepoint associated with the three bits mapping to a specific combination of a BFD or a lack of BFD and candidate reference signal reporting or a lack of candidate reference signal reporting for the first TRP and the second TRP.

Aspect 67: The apparatus of aspect 65, where the quantity of bits includes four bits, a first bit indicating a BFD or a lack of BFD for the first TRP, a second bit indicating candidate reference signal reporting or a lack of candidate reference signal reporting for the first TRP, a third bit indicating a BFD or a lack of BFD for the second TRP, and a fourth bit indicating candidate reference signal reporting or a lack of candidate reference signal reporting for the second TRP.

Aspect 68: The apparatus of any of aspects 64-67, where the instructions to receive the control signal indicating the TRP beam failure status are further executable by the processor to cause the apparatus to: receive the status indicator as a codepoint, where different codepoints indicate different formats of the control signal.

Aspect 69: The apparatus of aspect 68, where a first format associated with a BFD for both of the first TRP and the second TRP and reporting of a candidate reference signal ID for the first TRP and the second TRP; a second format associated with a BFD for at least one of the first TRP and the second TRP and reporting of a candidate reference signal ID for the one of the first TRP and the second TRP; and a third format associated with a BFD for at least one of the first TRP or the second TRP without reporting of candidate reference signal IDs.

Aspect 70: The apparatus of aspect 69, where the first format and the second format are associated with two octets of the control signal and the third format is associated with one octet of the control signal.

Aspect 71: The apparatus of any of aspects 64-70, where reported candidate reference signals are indicated by one or more of a TCI state, a reference signal ID, or a joint ID linking two or more reference signals.

Aspect 72: The apparatus of any of aspects 61-71, where the control signal includes a BFR MAC-CE.

Aspect 73: An apparatus for wireless communication at a UE, including: means for communicating with a first TRP in accordance with a first configuration for directional communications; means for communicating with a second TRP in accordance with a second configuration for directional communications; and means for transmitting a control signal indicating a TRP beam failure status for the first configuration for directional communications with the first TRP and the second configuration for directional communications with the second TRP.

Aspect 74: The apparatus of aspect 73, where the means for transmitting the control signal indicating the TRP beam failure status further include: means for transmitting, via the control signal, an indication of a cell associated with the first TRP and the second TRP on which a beam failure is detected.

Aspect 75: The apparatus of any of aspects 73 or 74, where the means for transmitting the control signal indicating the TRP beam failure status further include: means for transmitting, via the control signal, an indication of per-component carrier beam failure, where the TRP beam failure status is associated with a first component carrier that is enabled for TRP beam failure reporting.

Aspect 76: The apparatus of any of aspects 73-75, where the means for transmitting the control signal indicating the TRP beam failure status further include: means for transmitting, via the control signal, a status indicator indicating the TRP beam failure status and indicating whether a candidate reference signal is reported via the control signal for identified TRPs of the first TRP and the second TRP for which beam failure is detected.

Aspect 77: The apparatus of aspect 76, where the means for transmitting the control signal indicating the TRP beam failure status further include: means for transmitting the status indicator as a codepoint of a quantity of bits, where different codepoints indicate different TRP beam failure statuses and whether the candidate reference signal is reported via the control signal for the identified TRPs for which beam failure is detected.

Aspect 78: The apparatus of aspect 77, where the quantity of bits includes three bits, each codepoint associated with the three bits mapping to a specific combination of a BFD or a lack of BFD and candidate reference signal reporting or a lack of candidate reference signal reporting for first TRP and the second TRP.

Aspect 79: The apparatus of aspect 77, where the quantity of bits includes four bits, a first bit indicating a BFD or a lack of BFD for the first TRP, a second bit indicating candidate reference signal reporting or a lack of candidate reference signal reporting for the first TRP, a third bit indicating a BFD or a lack of BFD for the second TRP, and a fourth bit indicating candidate reference signal reporting or a lack of candidate reference signal reporting for the second TRP.

Aspect 80: The apparatus of any of aspects 76-79, where the means for transmitting the control signal indicating the TRP beam failure status further include: means for transmitting the status indicator as a codepoint, where different codepoints indicate different formats of the control signal.

Aspect 81: The apparatus of aspect 80, where a first format associated with a BFD for both of the first TRP and the second TRP and reporting of a candidate reference signal ID for the first TRP and the second TRP; a second format associated with a BFD for at least one of the first TRP and the second TRP and reporting of a candidate reference signal ID for the one of the first TRP and the second TRP; and a third format associated with a BFD for at least one of the first TRP or the second TRP without reporting of candidate reference signal IDs.

Aspect 82: The apparatus of aspect 81, where the first format and the second format are associated with two octets of the control signal and the third format is associated with one octet of the control signal.

Aspect 83: The apparatus of any of aspects 76-82, where reported candidate reference signals are indicated by one or more of a TCI state, a reference signal ID, or a joint ID linking two or more reference signals.

Aspect 84: The apparatus of any of aspects 73-83, where the control signal includes a BFR MAC-CE.

Aspect 85: An apparatus for wireless communication at a network entity, including: means for communicating with a UE via a first TRP in accordance with a first configuration for directional communications; means for communicating with the UE via a second TRP in accordance with a second configuration for directional communications; and means for receiving, from the UE, a control signal indicating a TRP beam failure status for the first configuration for directional communications with the first TRP and the second configuration for directional communications with the second TRP.

Aspect 86: The apparatus of aspect 85, where the means for receiving the control signal indicating the TRP beam failure status further include: means for receiving, via the control signal, an indication of a cell associated with the first TRP and the second TRP on which a beam failure is detected.

Aspect 87: The apparatus of any of aspects 85 or 86, where the means for receiving the control signal indicating the TRP beam failure status further include: means for receiving, via the control signal, an indication of per-component carrier beam failure, where the TRP beam failure status is associated with a first component carrier that is enabled for TRP beam failure reporting.

Aspect 88: The apparatus of any of aspects 85-87, where the means for receiving the control signal indicating the TRP beam failure status further include: means for receiving, via the control signal, a status indicator indicating the TRP beam failure status and indicating whether a candidate reference signal is reported via the control signal for identified TRPs of the first TRP and the second TRP for which beam failure is detected.

Aspect 89: The apparatus of aspect 88, where the means for receiving the control signal indicating the TRP beam failure status further include: means for receiving the status indicator as a codepoint of a quantity of bits, where different codepoints indicate different TRP beam failure statuses and whether the candidate reference signal is reported via the control signal for the identified TRPs for which beam failure is detected.

Aspect 90: The apparatus of aspect 89, where the quantity of bits includes three bits, each codepoint associated with the three bits mapping to a specific combination of a BFD or a lack of BFD and candidate reference signal reporting or a lack of candidate reference signal reporting for the first TRP and the second TRP.

Aspect 91: The apparatus of aspect 89, where the quantity of bits includes four bits, a first bit indicating a BFD or a lack of BFD for the first TRP, a second bit indicating candidate reference signal reporting or a lack of candidate reference signal reporting for the first TRP, a third bit indicating a BFD or a lack of BFD for the second TRP, and a fourth bit indicating candidate reference signal reporting or a lack of candidate reference signal reporting for the second TRP.

Aspect 92: The apparatus of any of aspects 88-91, where the means for receiving the control signal indicating the TRP beam failure status further include: means for receiving the status indicator as a codepoint, where different codepoints indicate different formats of the control signal.

Aspect 93: The apparatus of aspect 92, where a first format associated with a BFD for both of the first TRP and the second TRP and reporting of a candidate reference signal ID for the first TRP and the second TRP; a second format associated with a BFD for at least one of the first TRP and the second TRP and reporting of a candidate reference signal ID for the one of the first TRP and the second TRP; and a third format associated with a BFD for at least one of the first TRP or the second TRP without reporting of candidate reference signal IDs.

Aspect 94: The apparatus of aspect 93, where the first format and the second format are associated with two octets of the control signal and the third format is associated with one octet of the control signal.

Aspect 95: The apparatus of any of aspects 88-94, where reported candidate reference signals are indicated by one or more of a TCI state, a reference signal ID, or a joint ID linking two or more reference signals.

Aspect 96: The apparatus of any of aspects 85-95, where the control signal includes a BFR MAC-CE.

Aspect 97: A non-transitory computer-readable medium storing code for wireless communication at a UE, the code including instructions executable by a processor to: communicate with a first TRP in accordance with a first configuration for directional communications; communicate with a second TRP in accordance with a second configuration for directional communications; and transmit a control signal indicating a TRP beam failure status for the first configuration for directional communications with the first TRP and the second configuration for directional communications with the second TRP.

Aspect 98: The non-transitory computer-readable medium of aspect 97, where the instructions to transmit the control signal indicating the TRP beam failure status are further executable by the processor to: transmit, via the control signal, an indication of a cell associated with the first TRP and the second TRP on which a beam failure is detected.

Aspect 99: The non-transitory computer-readable medium of any of aspects 97 or 98, where the instructions to transmit the control signal indicating the TRP beam failure status are further executable by the processor to: transmit, via the control signal, an indication of per-component carrier beam failure, where the TRP beam failure status is associated with a first component carrier that is enabled for TRP beam failure reporting.

Aspect 100: The non-transitory computer-readable medium of any of aspects 97-99, where the instructions to transmit the control signal indicating the TRP beam failure status are further executable by the processor to: transmit, via the control signal, a status indicator indicating the TRP beam failure status and indicating whether a candidate reference signal is reported via the control signal for identified TRPs of the first TRP and the second TRP for which beam failure is detected.

Aspect 101: The non-transitory computer-readable medium of aspect 100, where the instructions to transmit the control signal indicating the TRP beam failure status are further executable by the processor to: transmit the status indicator as a codepoint of a quantity of bits, where different codepoints indicate different TRP beam failure statuses and whether the candidate reference signal is reported via the control signal for the identified TRPs for which beam failure is detected.

Aspect 102: The non-transitory computer-readable medium of aspect 101, where the quantity of bits includes three bits, each codepoint associated with the three bits mapping to a specific combination of a BFD or a lack of BFD and candidate reference signal reporting or a lack of candidate reference signal reporting for first TRP and the second TRP.

Aspect 103: The non-transitory computer-readable medium of aspect 101, where the quantity of bits includes four bits, a first bit indicating a BFD or a lack of BFD for the first TRP, a second bit indicating candidate reference signal reporting or a lack of candidate reference signal reporting for the first TRP, a third bit indicating a BFD or a lack of BFD for the second TRP, and a fourth bit indicating candidate reference signal reporting or a lack of candidate reference signal reporting for the second TRP.

Aspect 104: The non-transitory computer-readable medium of any of aspects 100-103, where the instructions to transmit the control signal indicating the TRP beam failure status are further executable by the processor to: transmit the status indicator as a codepoint, where different codepoints indicate different formats of the control signal.

Aspect 105: The non-transitory computer-readable medium of aspect 104, where a first format associated with a BFD for both of the first TRP and the second TRP and reporting of a candidate reference signal ID for the first TRP and the second TRP; a second format associated with a BFD for at least one of the first TRP and the second TRP and reporting of a candidate reference signal ID for the one of the first TRP and the second TRP; and a third format associated with a BFD for at least one of the first TRP or the second TRP without reporting of candidate reference signal IDs.

Aspect 106: The non-transitory computer-readable medium of aspect 105, where the first format and the second format are associated with two octets of the control signal and the third format is associated with one octet of the control signal.

Aspect 107: The non-transitory computer-readable medium of any of aspects 100-106, where reported candidate reference signals are indicated by one or more of a TCI state, a reference signal ID, or a joint ID linking two or more reference signals.

Aspect 108: The non-transitory computer-readable medium of any of aspects 97-107, where the control signal includes a BFR MAC-CE.

Aspect 109: A non-transitory computer-readable medium storing code for wireless communication at a network entity, the code including instructions executable by a processor to: communicate with a UE via a first TRP in accordance with a first configuration for directional communications; communicate with the UE via a second TRP in accordance with a second configuration for directional communications; and receive, from the UE, a control signal indicating a TRP beam failure status for the first configuration for directional communications with the first TRP and the second configuration for directional communications with the second TRP.

Aspect 110: The non-transitory computer-readable medium of aspect 109, where the instructions to receive the control signal indicating the TRP beam failure status are further executable by the processor to: receive, via the control signal, an indication of a cell associated with the first TRP and the second TRP on which a beam failure is detected.

Aspect 111: The non-transitory computer-readable medium of any of aspects 109 or 110, where the instructions to receive the control signal indicating the TRP beam failure status are further executable by the processor to: receive, via the control signal, an indication of per-component carrier beam failure, where the TRP beam failure status is associated with a first component carrier that is enabled for TRP beam failure reporting.

Aspect 112: The non-transitory computer-readable medium of any of aspects 109-111, where the instructions to receive the control signal indicating the TRP beam failure status are further executable by the processor to: receive, via the control signal, a status indicator indicating the TRP beam failure status and indicating whether a candidate reference signal is reported via the control signal for identified TRPs of the first TRP and the second TRP for which beam failure is detected.

Aspect 113: The non-transitory computer-readable medium of aspect 112, where the instructions to receive the control signal indicating the TRP beam failure status are further executable by the processor to: receive the status indicator as a codepoint of a quantity of bits, where different codepoints indicate different TRP beam failure statuses and whether the candidate reference signal is reported via the control signal for the identified TRPs for which beam failure is detected.

Aspect 114: The non-transitory computer-readable medium of aspect 113, where the quantity of bits includes three bits, each codepoint associated with the three bits mapping to a specific combination of a BFD or a lack of BFD and candidate reference signal reporting or a lack of candidate reference signal reporting for the first TRP and the second TRP.

Aspect 115: The non-transitory computer-readable medium of aspect 113, where the quantity of bits includes four bits, a first bit indicating a BFD or a lack of BFD for the first TRP, a second bit indicating candidate reference signal reporting or a lack of candidate reference signal reporting for the first TRP, a third bit indicating a BFD or a lack of BFD for the second TRP, and a fourth bit indicating candidate reference signal reporting or a lack of candidate reference signal reporting for the second TRP.

Aspect 116: The non-transitory computer-readable medium of any of aspects 112-115, where the instructions to receive the control signal indicating the TRP beam failure status are further executable by the processor to: receive the status indicator as a codepoint, where different codepoints indicate different formats of the control signal.

Aspect 117: The non-transitory computer-readable medium of aspect 116, where a first format associated with a BFD for both of the first TRP and the second TRP and reporting of a candidate reference signal ID for the first TRP and the second TRP; a second format associated with a BFD for at least one of the first TRP and the second TRP and reporting of a candidate reference signal ID for the one of the first TRP and the second TRP; and a third format associated with a BFD for at least one of the first TRP or the second TRP without reporting of candidate reference signal IDs.

Aspect 118: The non-transitory computer-readable medium of aspect 117, where the first format and the second format are associated with two octets of the control signal and the third format is associated with one octet of the control signal.

Aspect 119: The non-transitory computer-readable medium of any of aspects 112-118, where reported candidate reference signals are indicated by one or more of a TCI state, a reference signal ID, or a joint ID linking two or more reference signals.

Aspect 120: The non-transitory computer-readable medium of any of aspects 109-119, where the control signal includes a BFR MAC-CE.

As used herein, the term “determine” or “determining” encompasses a wide variety of actions and, therefore, “determining” can include calculating, computing, processing, deriving, investigating, looking up (such as via looking up in a table, a database or another data structure), ascertaining and the like. Also, “determining” can include receiving (such as receiving information), accessing (such as accessing data in a memory) and the like. Also, “determining” can include resolving, selecting, choosing, establishing and other such similar actions.

As used herein, a phrase referring to “at least one of” a list of items refers to any combination of those items, including single members. As an example, “at least one of: a, b, or c” is intended to cover: a, b, c, a-b, a-c, b-c, and a-b-c.

The various illustrative logics, logical blocks, modules, circuits and algorithm processes described in connection with the implementations disclosed herein may be implemented as electronic hardware, computer software, or combinations of both. The interchangeability of hardware and software has been described generally, in terms of functionality, and illustrated in the various illustrative components, blocks, modules, circuits and processes described herein. Whether such functionality is implemented in hardware or software depends upon the particular application and design constraints imposed on the overall system.

The hardware and data processing apparatus used to implement the various illustrative logics, logical blocks, modules and circuits described in connection with the aspects disclosed herein may be implemented or performed with a general purpose single- or multi-chip processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, or any processor, controller, microcontroller, or state machine. A processor also may be implemented as a combination of computing devices, such as a combination of a DSP and a microprocessor, a plurality of microprocessors, one or more microprocessors in conjunction with a DSP core, or any other such configuration. In some implementations, particular processes and methods may be performed by circuitry that is specific to a given function.

In one or more aspects, the functions described may be implemented in hardware, digital electronic circuitry, computer software, firmware, including the structures disclosed in this specification and their structural equivalents thereof, or in any combination thereof. Implementations of the subject matter described in this specification also can be implemented as one or more computer programs, such as one or more modules of computer program instructions, encoded on a computer storage media for execution by, or to control the operation of, data processing apparatus.

If implemented in software, the functions may be stored on or transmitted over as one or more instructions or code on a computer-readable medium. The processes of a method or algorithm disclosed herein may be implemented in a processor-executable software module which may reside on a computer-readable medium. Computer-readable media includes both computer storage media and communication media including any medium that can be enabled to transfer a computer program from one place to another. A storage media may be any available media that may be accessed by a computer. By way of example, and not limitation, such computer-readable media may include RAM, ROM, EEPROM, CD-ROM or other optical disk storage, magnetic disk storage or other magnetic storage devices, or any other medium that may be used to store desired program code in the form of instructions or data structures and that may be accessed by a computer. Also, any connection can be properly termed a computer-readable medium. Disk and disc, as used herein, includes compact disc (CD), laser disc, optical disc, digital versatile disc (DVD), floppy disk, and Blu-ray disc where disks usually reproduce data magnetically, while discs reproduce data optically with lasers. Combinations of the above should also be included within the scope of computer-readable media. Additionally, the operations of a method or algorithm may reside as one or any combination or set of codes and instructions on a machine readable medium and computer-readable medium, which may be incorporated into a computer program product.

Various modifications to the implementations described in this disclosure may be readily apparent to those skilled in the art, and the generic principles defined herein may be applied to other implementations without departing from the spirit or scope of this disclosure. Thus, the claims are not intended to be limited to the implementations shown herein, but are to be accorded the widest scope consistent with this disclosure, the principles and the features disclosed herein.

Additionally, a person having ordinary skill in the art will readily appreciate, the terms "upper" and "lower" are sometimes used for ease of describing the figures, and indicate relative positions corresponding to the orientation of the figure on a properly oriented page, and may not reflect the proper orientation of any device as implemented.

Certain features that are described in this specification in the context of separate implementations also can be implemented in combination in a single implementation. Conversely, various features that are described in the context of a single implementation also can be implemented in multiple implementations separately or in any suitable subcombination. Moreover, although features may be described herein as acting in some combinations and even initially claimed as such, one or more features from a claimed combination can be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. Further, the drawings may schematically depict one more example processes in the form of a flow diagram. However, other operations that are not depicted can be incorporated in the example processes that are schematically illustrated. For example, one or more additional operations can be performed before, after, simultaneously, or between any of the illustrated operations. In some circumstances, multitasking and parallel processing may be advantageous. Moreover, the separation of various system components in the implementations described herein should not be understood as requiring such separation in all implementations, and it should be understood that the described program components and systems can generally be integrated together in a single software product or packaged into multiple software products. Additionally, other implementations are within the scope of the following claims. In some implementations, the actions recited in the claims can be performed in a different order and still achieve desirable results.

What is claimed is:

1. An apparatus for wireless communication at a user equipment (UE), comprising:

a first interface configured to:

communicate with a first transmission and reception point (TRP) in accordance with a first configuration for directional communications;

communicate with a second TRP in accordance with a second configuration for directional communications; and the first interface or a second interface configured to:

output a control signal indicating a TRP beam failure status for the first configuration for directional communications with the first TRP and the second configuration for directional communications with the second TRP, wherein outputting the control signal indicating the TRP beam failure status further comprises:

outputting, via the control signal, a status indicator as a codepoint indicating the TRP beam failure status and indicating whether a candidate reference signal is reported via the control signal for identified TRPs of the first TRP and the second TRP for which beam failure is detected, wherein different codepoints indicate different formats of the control signal.

2. The apparatus of claim 1, wherein outputting the control signal indicating the TRP beam failure status further comprises:

outputting, via the control signal, an indication of a cell associated with the first TRP and the second TRP on which a beam failure is detected.

3. The apparatus of claim 1, wherein outputting the control signal indicating the TRP beam failure status further comprises:

outputting, via the control signal, an indication of per-component carrier beam failure, wherein the TRP beam failure status is associated with a first component carrier that is enabled for TRP beam failure reporting.

4. The apparatus of claim 1, wherein the codepoint comprises a quantity of bits, wherein different codepoints indicate different TRP beam failure statuses and whether the candidate reference signal is reported via the control signal for the identified TRPs for which beam failure is detected.

5. The apparatus of claim 4, wherein the quantity of bits comprises three bits, each codepoint associated with the three bits mapping to a specific combination of a beam failure detection or a lack of beam failure detection and candidate reference signal reporting or a lack of candidate reference signal reporting for first TRP and the second TRP.

6. The apparatus of claim 4, wherein the quantity of bits comprises four bits, a first bit indicating a beam failure detection or a lack of beam failure detection for the first TRP, a second bit indicating candidate reference signal reporting or a lack of candidate reference signal reporting for the first TRP, a third bit indicating a beam failure detection or a lack of beam failure detection for the second TRP, and a fourth bit indicating candidate reference signal reporting or a lack of candidate reference signal reporting for the second TRP.

7. The apparatus of claim 1, wherein the status indicator indicates one of:

a first format associated with a beam failure detection for both of the first TRP and the second TRP and reporting of a candidate reference signal identifier for the first TRP and the second TRP;

a second format associated with a beam failure detection for at least one of the first TRP and the second TRP and reporting of a candidate reference signal identifier for the one of the first TRP and the second TRP; and a third format associated with a beam failure detection for at least one of the first TRP or the second TRP without reporting of candidate reference signal identifiers.

8. The apparatus of claim 7, wherein the first format and the second format are associated with two octets of the control signal and the third format is associated with one octet of the control signal.

9. The apparatus of claim 1, wherein reported candidate reference signals are indicated by one or more of a transmission configuration indicator (TCI) state, a reference signal identifier, or a joint identifier linking two or more reference signals.

10. The apparatus of claim 1, wherein the control signal comprises a beam failure recovery (BFR) medium access control (MAC) control element (MAC-CE).

11. An apparatus for wireless communication at a network entity, comprising:

a first interface configured to:

communicate with a user equipment (UE) via a first transmission and reception point (TRP) in accordance with a first configuration for directional communications;

communicate with the UE via a second TRP in accordance with a second configuration for directional communications; and the first interface or a second interface configured to:

obtain, from the UE, a control signal indicating a TRP beam failure status for the first configuration for directional communications with the first TRP and the second configuration for directional communications with the second TRP, wherein obtaining the control signal indicating the TRP beam failure status further comprises:

obtaining, via the control signal, a status indicator as a codepoint indicating the TRP beam failure status and indicating whether a candidate reference signal is reported via the control signal for identified TRPs of the first TRP and the second TRP for which beam failure is detected, wherein different codepoints indicate different formats of the control signal.

12. The apparatus of claim 11, wherein obtaining the control signal indicating the TRP beam failure status further comprises:

obtaining, via the control signal, an indication of a cell associated with the first TRP and the second TRP on which a beam failure is detected.

13. The apparatus of claim 11, wherein obtaining the control signal indicating the TRP beam failure status further comprises:

obtaining, via the control signal, an indication of per-component carrier beam failure, wherein the TRP beam failure status is associated with a first component carrier that is enabled for TRP beam failure reporting.

14. The apparatus of claim 11, wherein obtaining the control signal indicating the TRP beam failure status further comprises:

obtaining the status indicator as a codepoint of a quantity of bits, wherein different codepoints indicate different TRP beam failure statuses and whether the candidate reference signal is reported via the control signal for the identified TRPs for which beam failure is detected.

15. The apparatus of claim 14, wherein the quantity of bits comprises three bits, each codepoint associated with the three bits mapping to a specific combination of a beam failure detection or a lack of beam failure detection and candidate reference signal reporting or a lack of candidate reference signal reporting for the first TRP and the second TRP.

16. The apparatus of claim 14, wherein the quantity of bits comprises four bits, a first bit indicating a beam failure detection or a lack of beam failure detection for the first TRP, a second bit indicating candidate reference signal reporting or a lack of candidate reference signal reporting for the first TRP, a third bit indicating a beam failure detection or a lack of beam failure detection for the second TRP, and a fourth bit indicating candidate reference signal reporting or a lack of candidate reference signal reporting for the second TRP.

17. The apparatus of claim 11, wherein the status indicator indicates one of:

a first format associated with a beam failure detection for both of the first TRP and the second TRP and reporting of a candidate reference signal identifier for the first TRP and the second TRP;

a second format associated with a beam failure detection for at least one of the first TRP and the second TRP and reporting of a candidate reference signal identifier for the one of the first TRP and the second TRP; and a third format associated with a beam failure detection for at least one of the first TRP or the second TRP without reporting of candidate reference signal identifiers.

18. A method for wireless communication at a user equipment (UE), comprising:

communicating with a first transmission and reception point (TRP) in accordance with a first configuration for directional communications;

communicating with a second TRP in accordance with a second configuration for directional communications; and transmitting a control signal indicating a TRP beam failure status for the first configuration for directional communications with the first TRP and the second configuration for directional communications with the second TRP, wherein outputting the control signal indicating the TRP beam failure status further comprises:

transmitting, via the control signal, a status indicator as a codepoint indicating the TRP beam failure status and indicating whether a candidate reference signal is reported via the control signal for identified TRPs of the first TRP and the second TRP for which beam failure is detected, wherein different codepoints indicate different formats of the control signal.

19. The method of claim 18, wherein transmitting the control signal indicating the TRP beam failure status further comprises:

transmitting, via the control signal, an indication of a cell associated with the first TRP and the second TRP on which a beam failure is detected.

20. The method of claim 18, wherein transmitting the control signal indicating the TRP beam failure status further comprises:

transmitting, via the control signal, an indication of per-component carrier beam failure, wherein the TRP beam failure status is associated with a first component carrier that is enabled for TRP beam failure reporting.

21. The method of claim 18, wherein the codepoint comprises a quantity of bits, wherein different codepoints indicate different TRP beam failure statuses and whether the candidate reference signal is reported via the control signal for the identified TRPs for which beam failure is detected.

22. A method for wireless communication at a network entity, comprising:

communicating with a user equipment (UE) via a first transmission and reception point (TRP) in accordance with a first configuration for directional communications;

communicating with the UE via a second TRP in accordance with a second configuration for directional communications; and receiving, from the UE, a control signal indicating a TRP beam failure status for the first configuration for directional communications with the first TRP and the second configuration for directional communications with the second TRP, wherein receiving the control signal indicating the TRP beam failure status further comprises:

receiving, via the control signal, a status indicator as a codepoint indicating the TRP beam failure status and indicating whether a candidate reference signal is reported via the control signal for identified TRPs of the first TRP and the second TRP for which beam failure is detected, wherein different codepoints indicate different formats of the control signal.

23. The method of claim 22, wherein receiving the control signal indicating the TRP beam failure status further comprises:

receiving, via the control signal, an indication of a cell associated with the first TRP and the second TRP on which a beam failure is detected.

24. The method of claim 22, wherein receiving the control signal indicating the TRP beam failure status further comprises:

receiving, via the control signal, an indication of per-component carrier beam failure, wherein the TRP beam failure status is associated with a first component carrier that is enabled for TRP beam failure reporting.

* * * * *